United States Patent
Lee

(10) Patent No.: US 10,595,355 B2
(45) Date of Patent: Mar. 17, 2020

(54) METHOD AND APPARATUS FOR ESTABLISHING A CONNECTION IN A WIRELESS COMMUNICATION SYSTEM

(71) Applicant: LG ELECTRONICS INC., Seoul (KR)

(72) Inventor: Ki-Dong Lee, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 30 days.

(21) Appl. No.: 15/881,144

(22) Filed: Jan. 26, 2018

(65) Prior Publication Data
US 2019/0014612 A1    Jan. 10, 2019

Related U.S. Application Data

(60) Provisional application No. 62/530,817, filed on Jul. 10, 2017, provisional application No. 62/534,635, filed on Jul. 19, 2017.

(51) Int. Cl.
| | | |
|---|---|---|
| *H04W 76/16* | (2018.01) | |
| *H04W 76/38* | (2018.01) | |
| *H04W 52/02* | (2009.01) | |
| *H04W 68/02* | (2009.01) | |
| *H04W 60/04* | (2009.01) | |
| *H04W 8/22* | (2009.01) | |
| *H04W 88/06* | (2009.01) | |
| *H04W 36/00* | (2009.01) | |

(52) U.S. Cl.
CPC ....... *H04W 76/16* (2018.02); *H04W 52/0212* (2013.01); *H04W 68/02* (2013.01); *H04W 76/38* (2018.02); *H04W 8/22* (2013.01); *H04W 36/0069* (2018.08); *H04W 60/04* (2013.01); *H04W 88/06* (2013.01)

(58) Field of Classification Search
CPC ..... H04W 52/02; H04W 60/04; H04W 68/02; H04W 76/38; H04W 76/16; H04W 52/0212
See application file for complete search history.

(56) References Cited

U.S. PATENT DOCUMENTS

| | | | | |
|---|---|---|---|---|
| 2013/0260740 A1* | 10/2013 | Rayavarapu | .......... | H04W 76/27 455/422.1 |
| 2016/0374137 A1* | 12/2016 | Adjakple | .............. | H04W 76/15 |

* cited by examiner

*Primary Examiner* — Kyaw Z Soe
(74) *Attorney, Agent, or Firm* — Lee Hong Degerman Kang Waimey

(57) ABSTRACT

Disclosed herein is a method for establishing a connection between a terminal and a network entity in a wireless communication system including a Non-3GPP RAT. The method performed by a network entity comprises receiving, from the terminal, a first message including cell identification information indicating a last cell accessed by the terminal; running a first timer related to a paging when the network entity receives the first message; and transmitting a paging message to a cell corresponding to the cell identification information when the paging to the terminal is required before the running first timer expires.

18 Claims, 19 Drawing Sheets

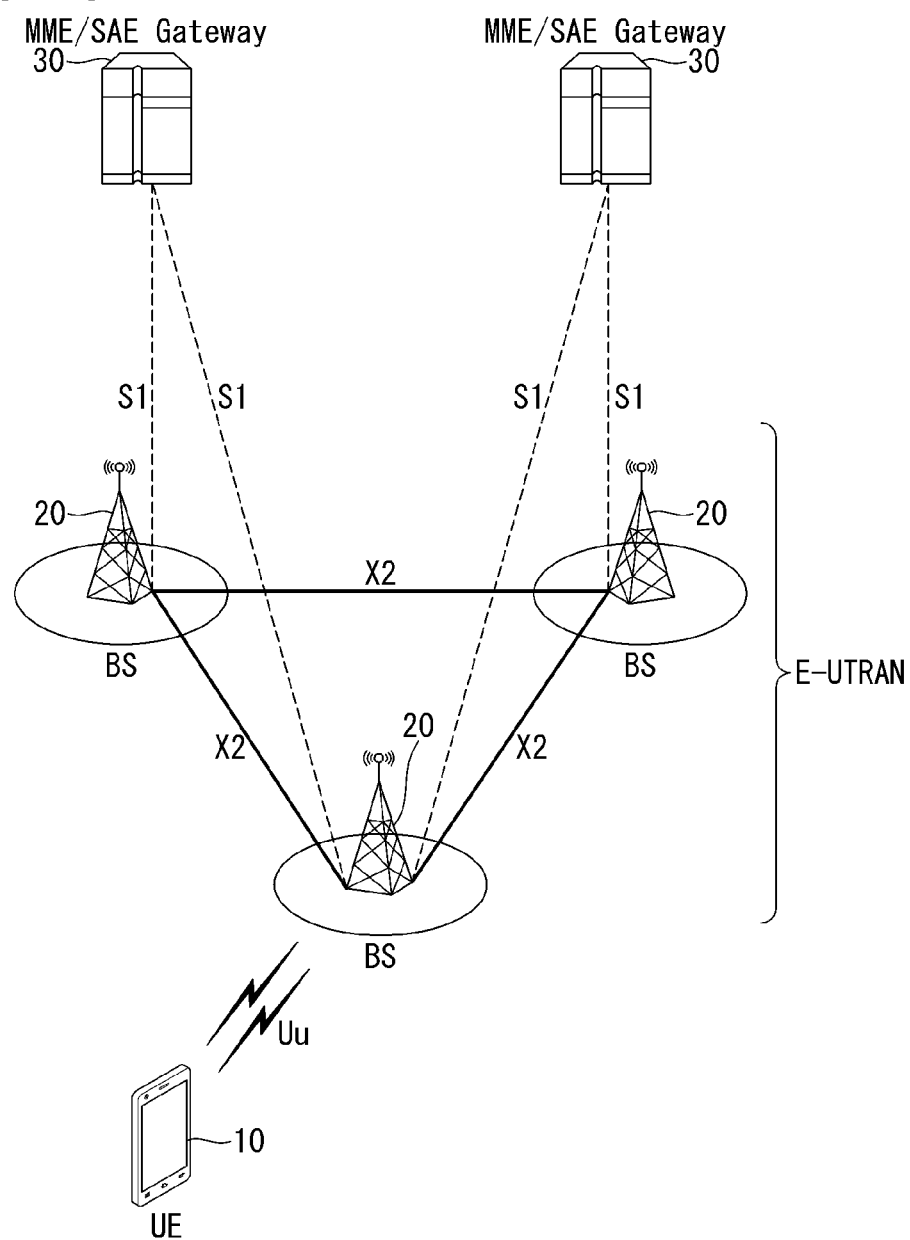
[FIG. 1]

[FIG. 2]
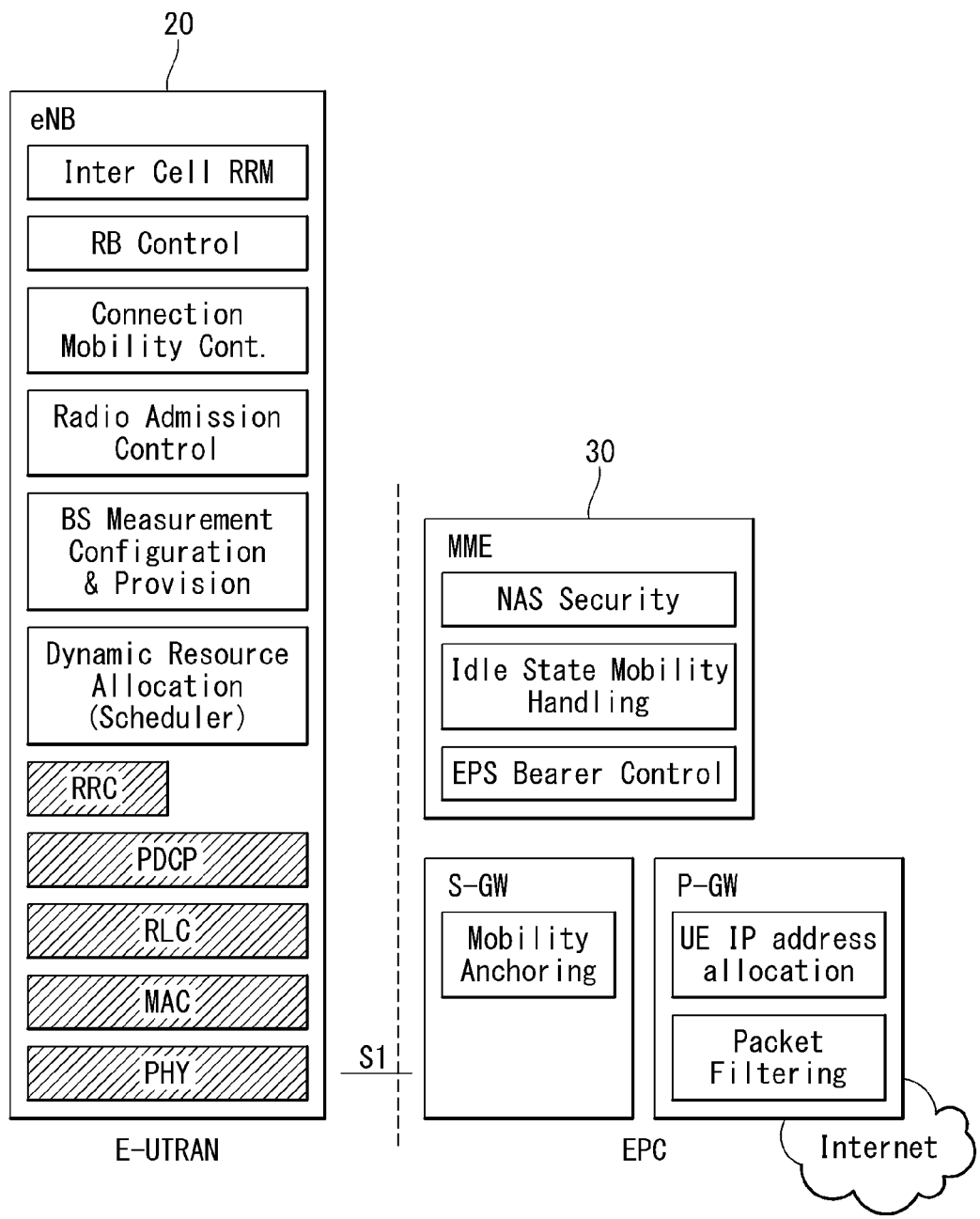

[FIG. 3]
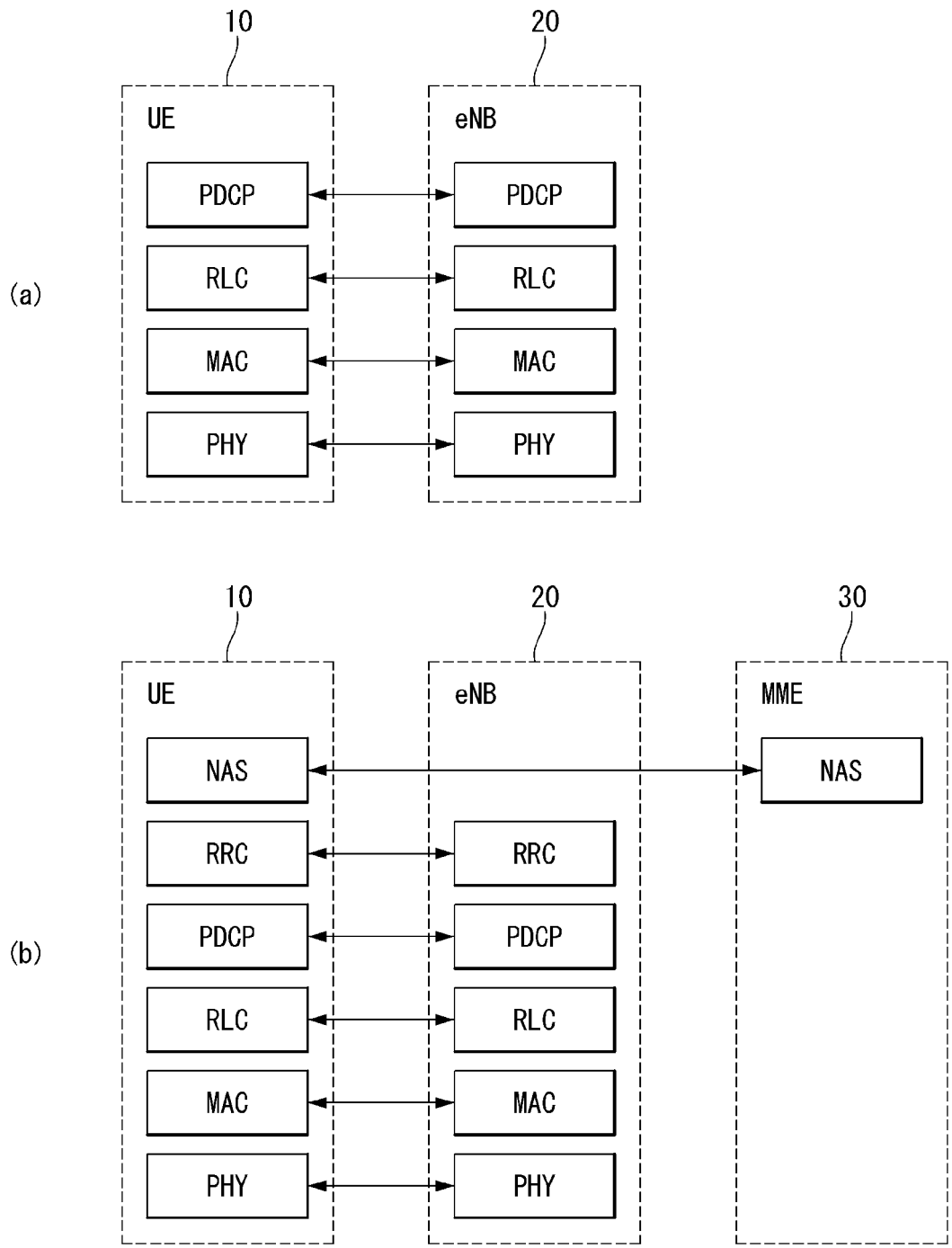

[FIG. 4]
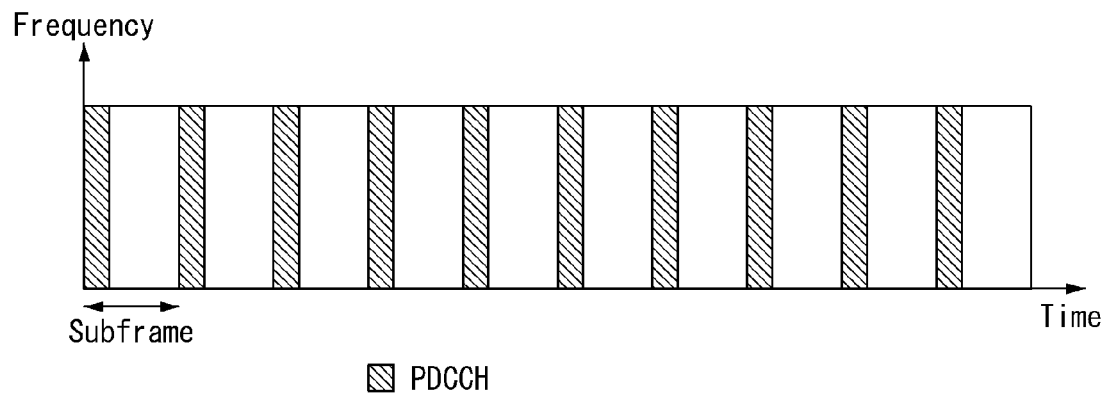
[FIG. 5]
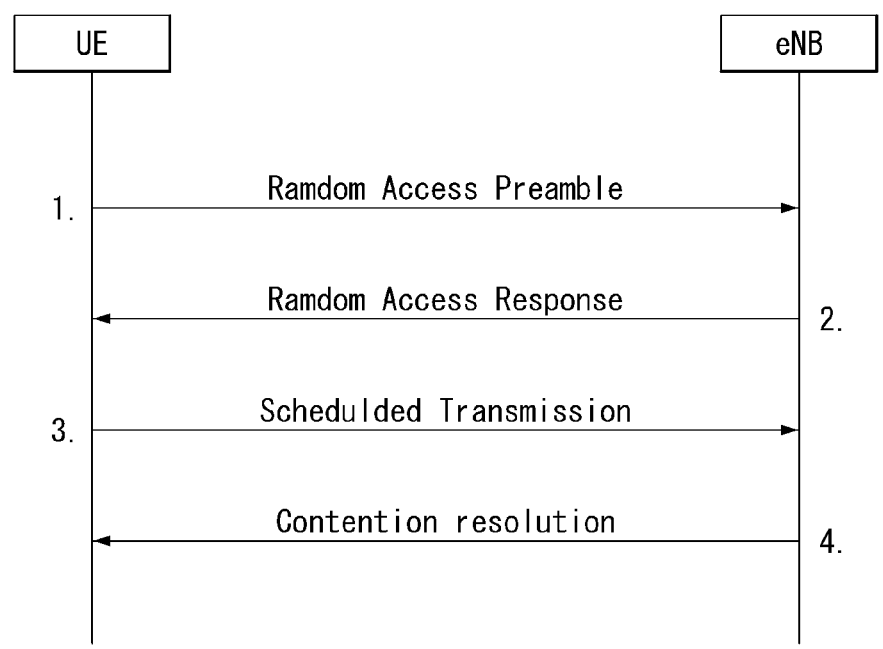

[FIG. 6]
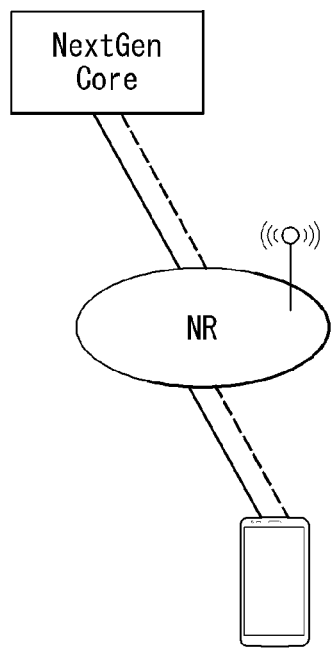
[FIG. 7]
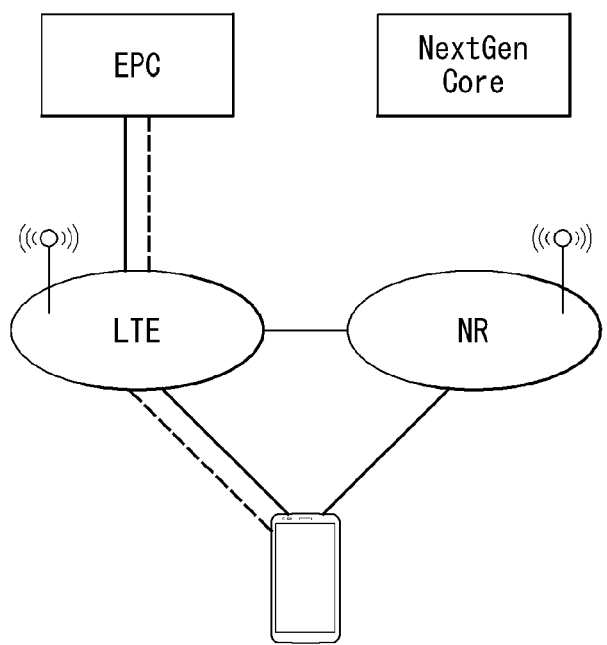

[FIG. 8]
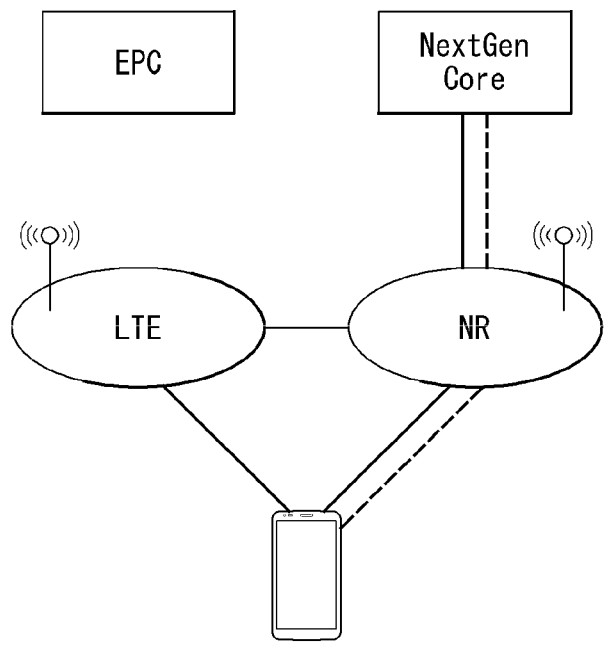
[FIG. 9]
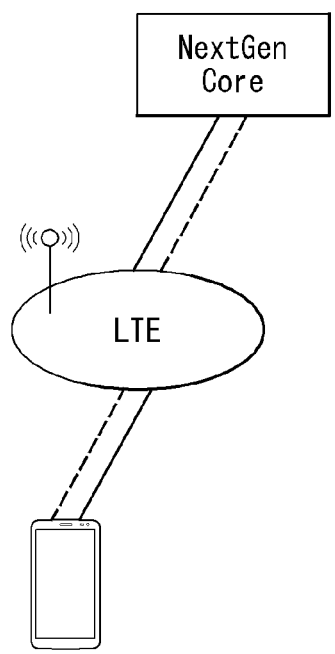

[FIG. 10]
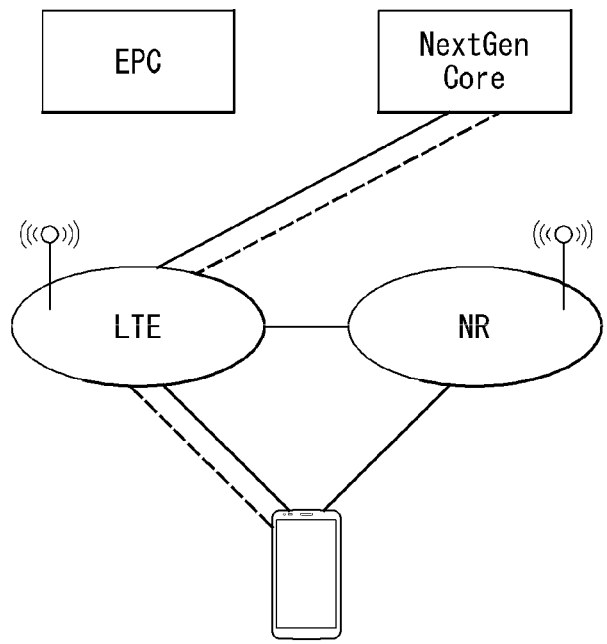
[FIG. 11]
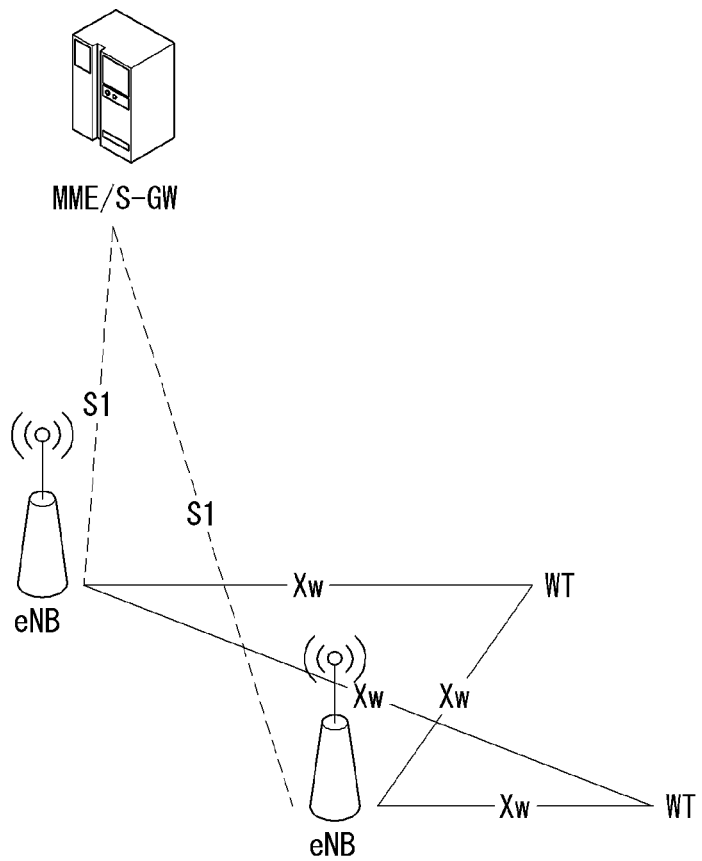

[FIG. 12]
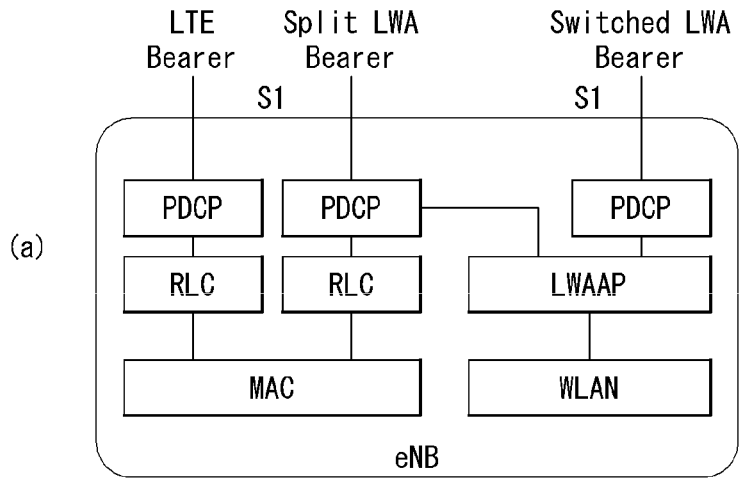
(a)
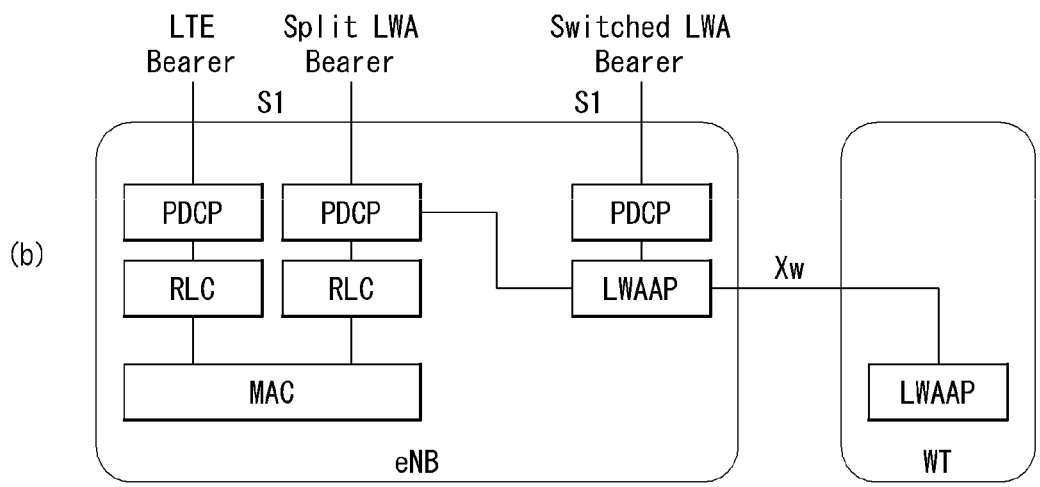
(b)

[FIG. 13]
(a)
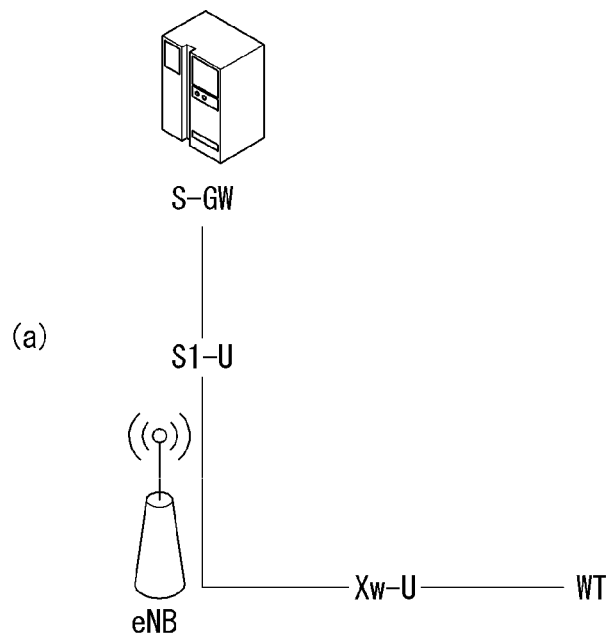
(b)
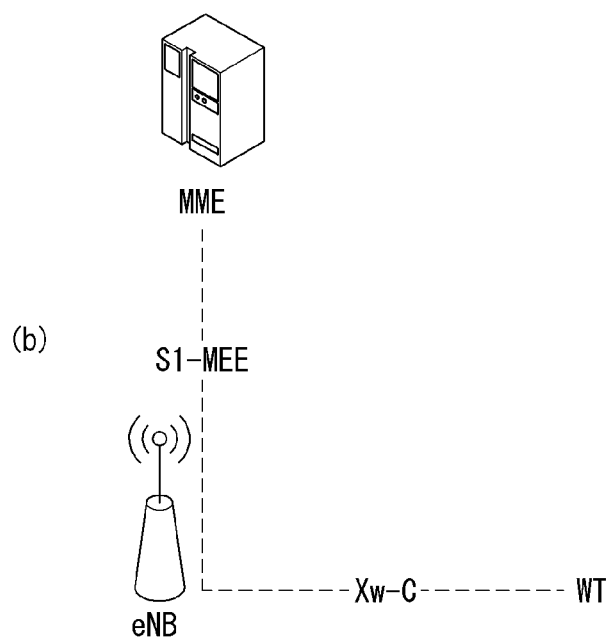

[FIG. 14]
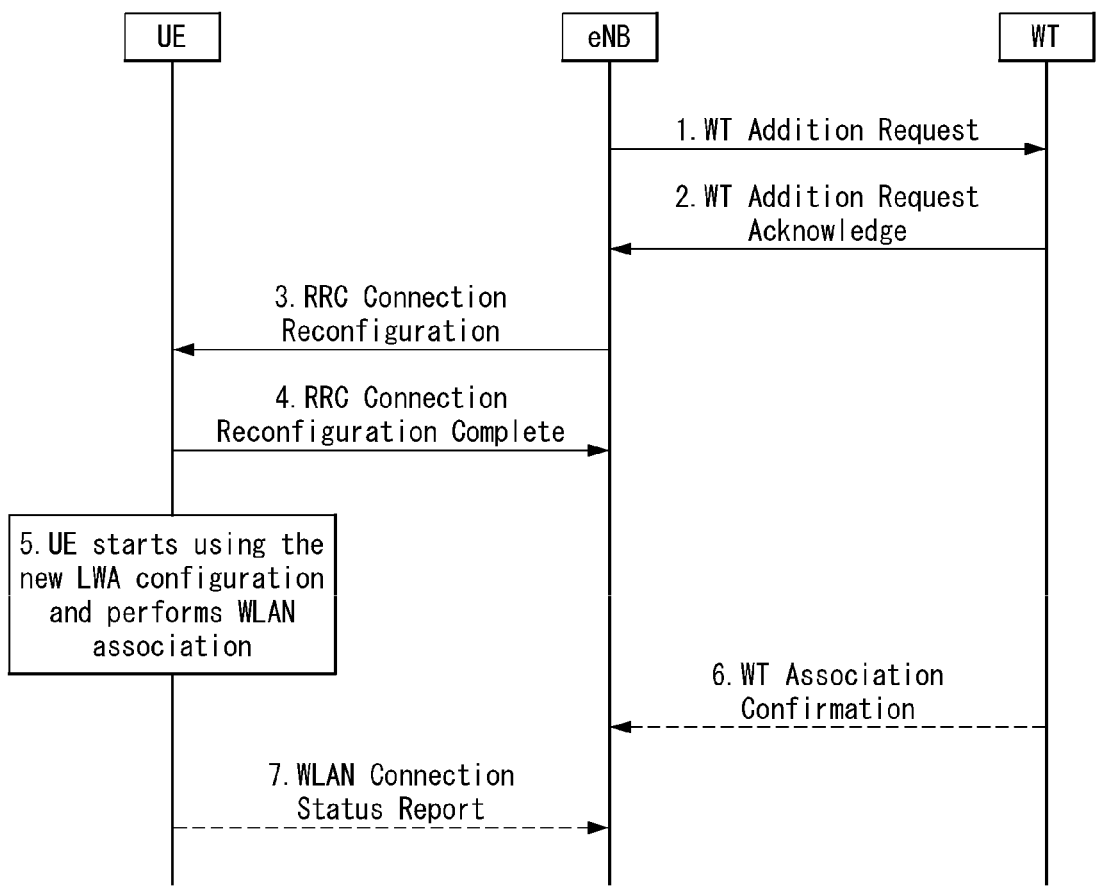

[FIG. 15]
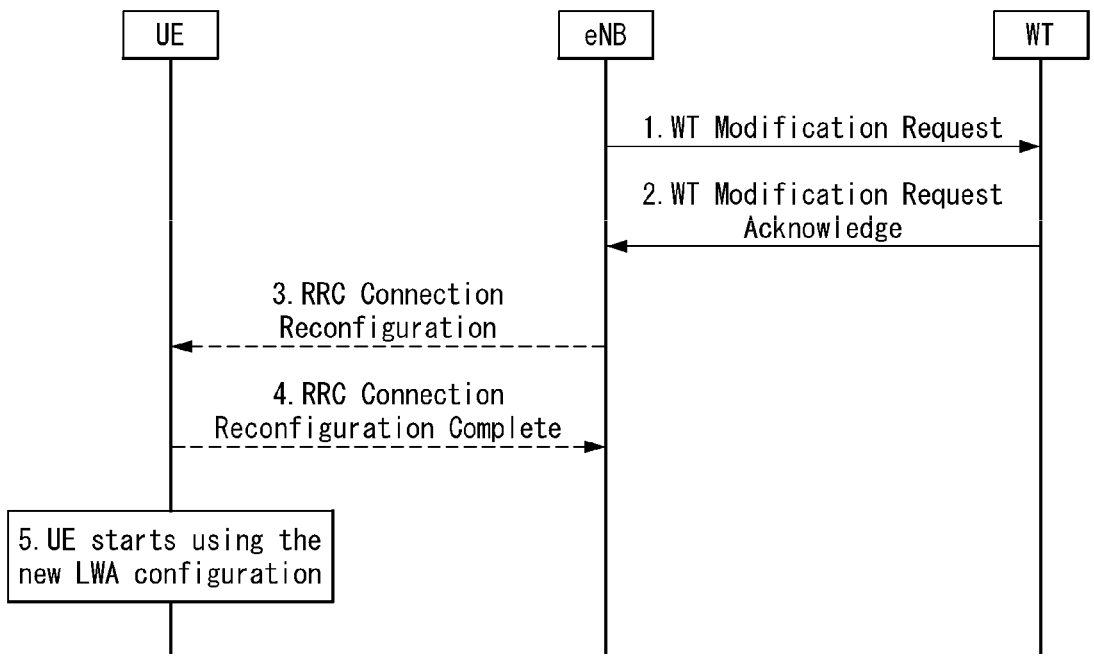
[FIG. 16]
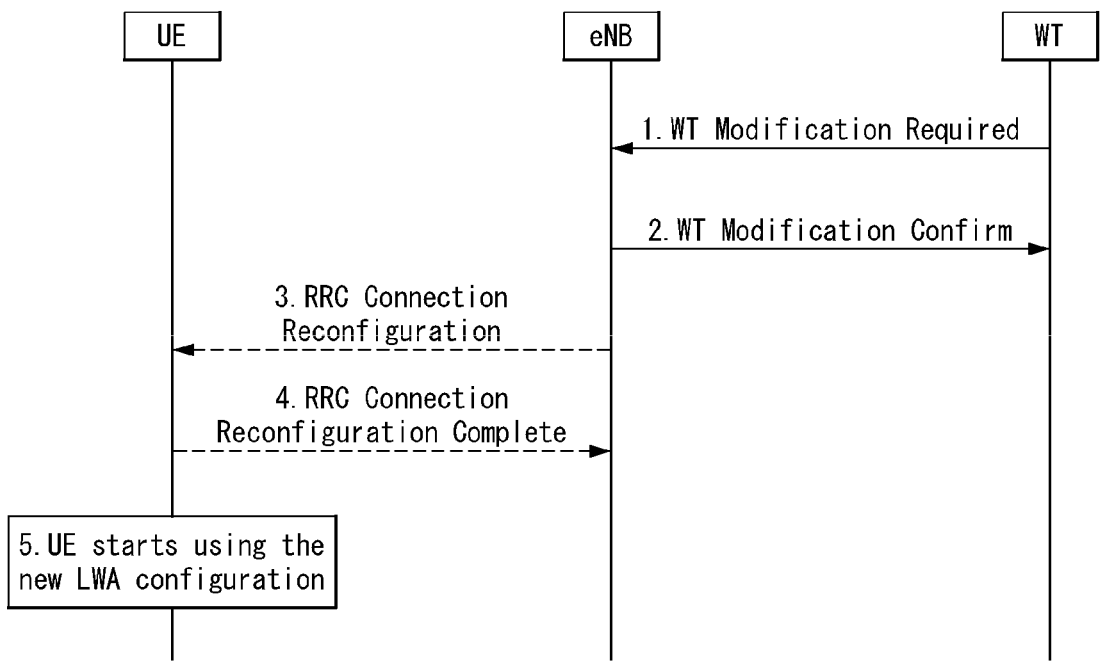

[FIG. 17]
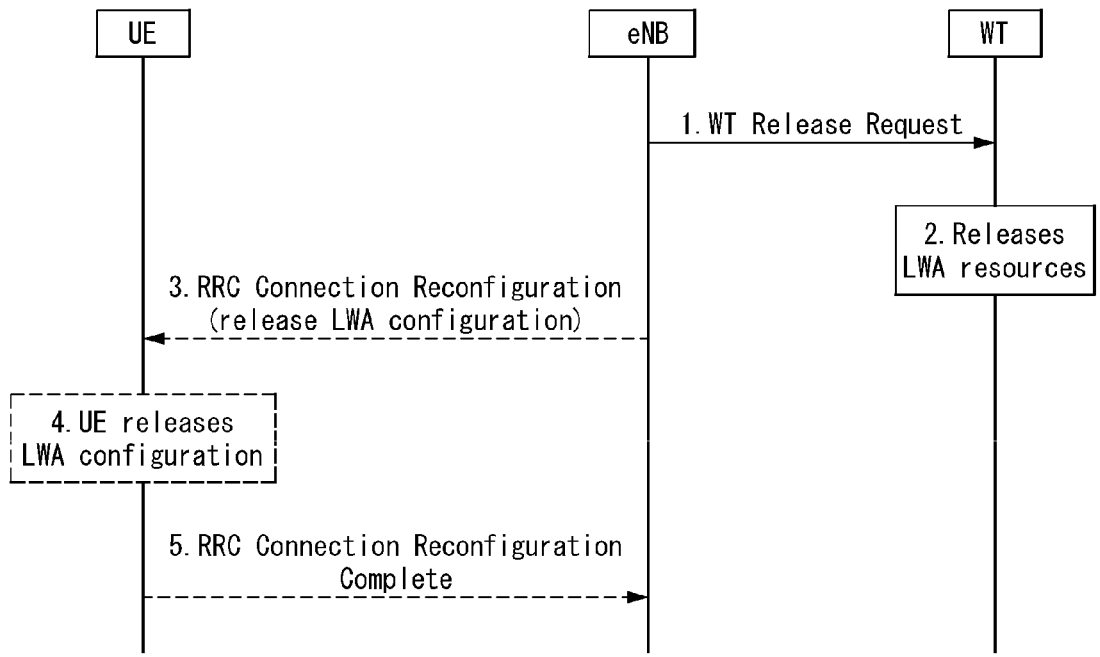
[FIG. 18]
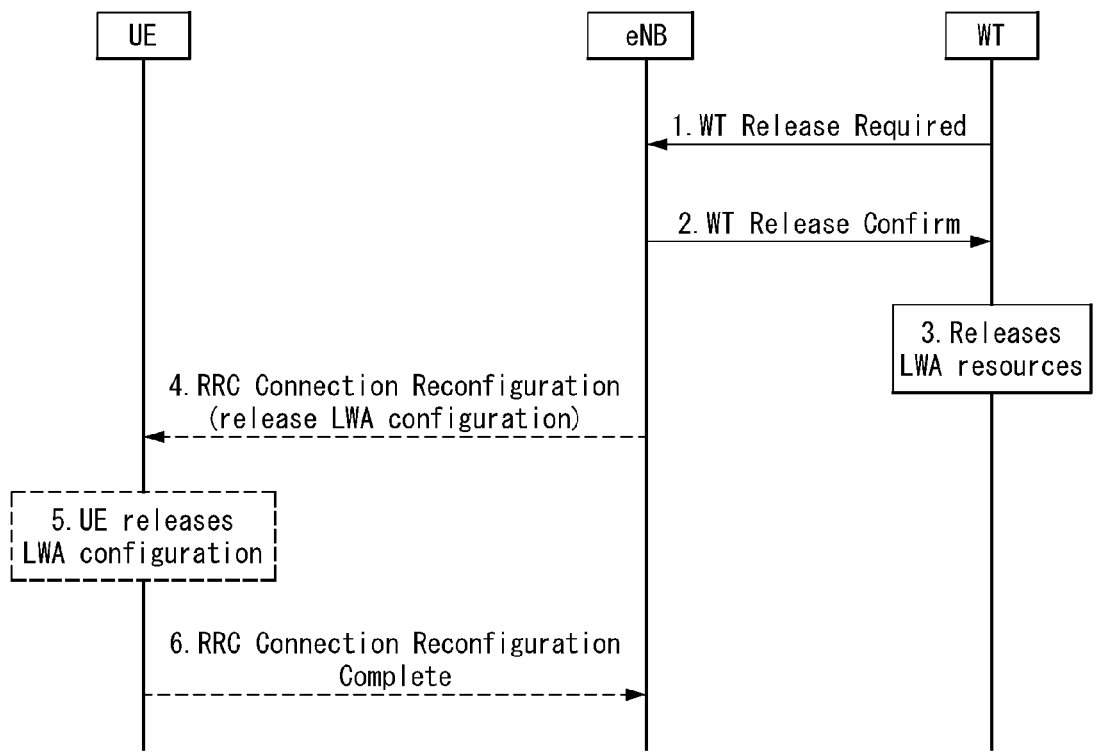

[FIG. 19]
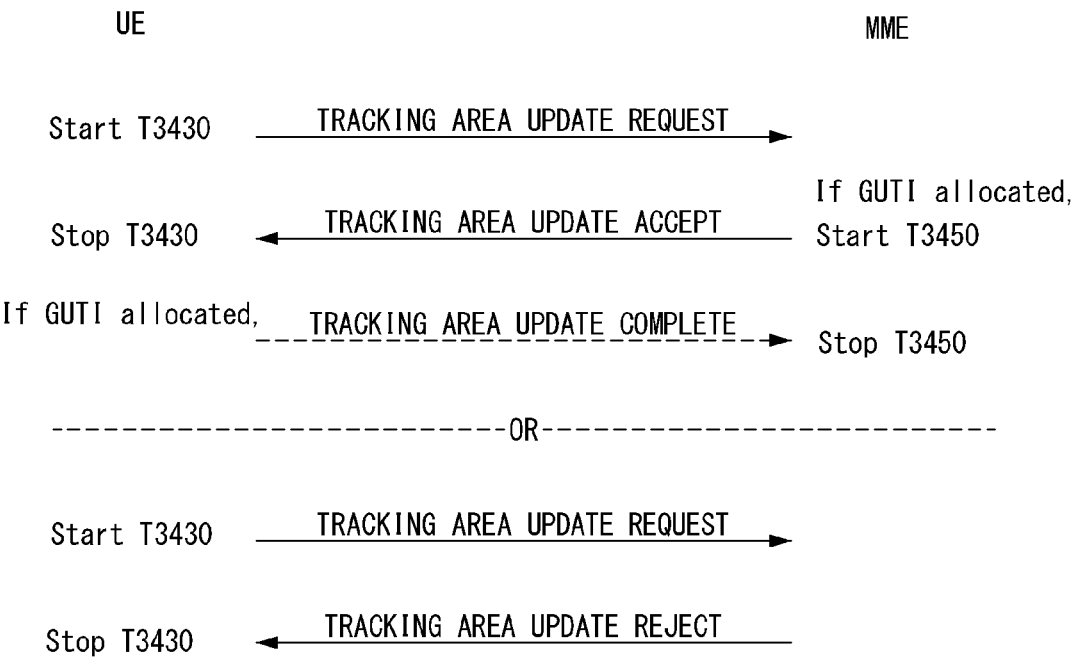
[FIG. 20]
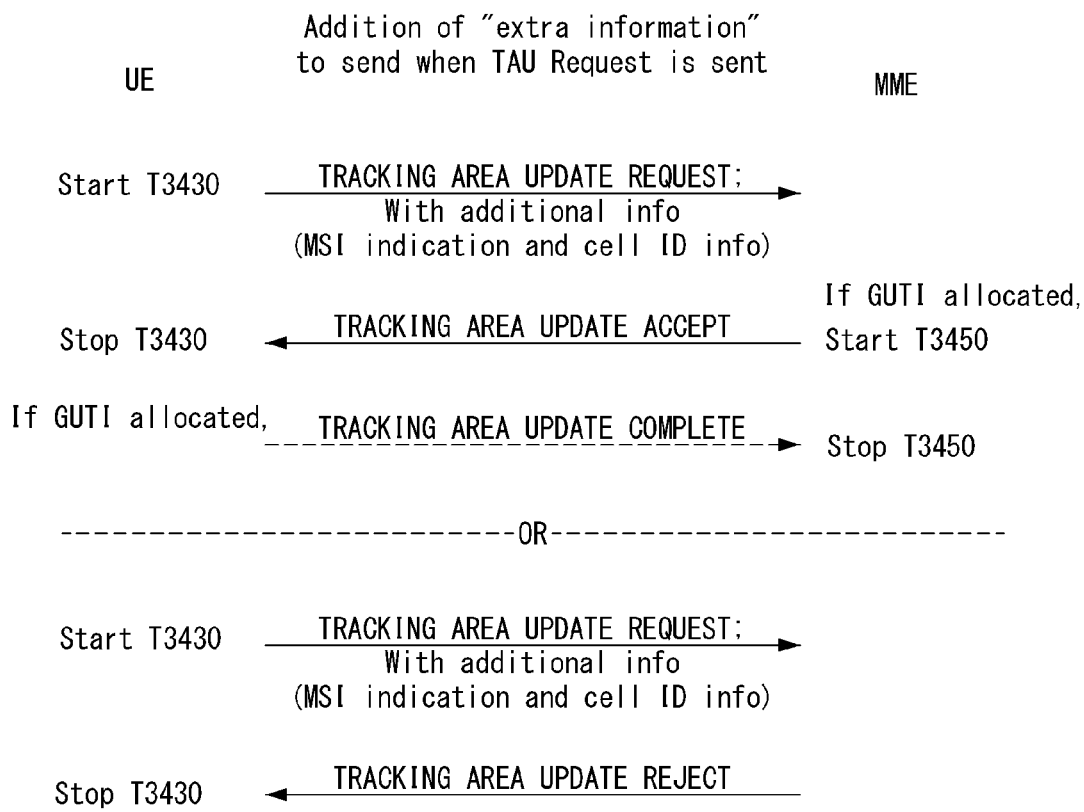

[FIG. 21]
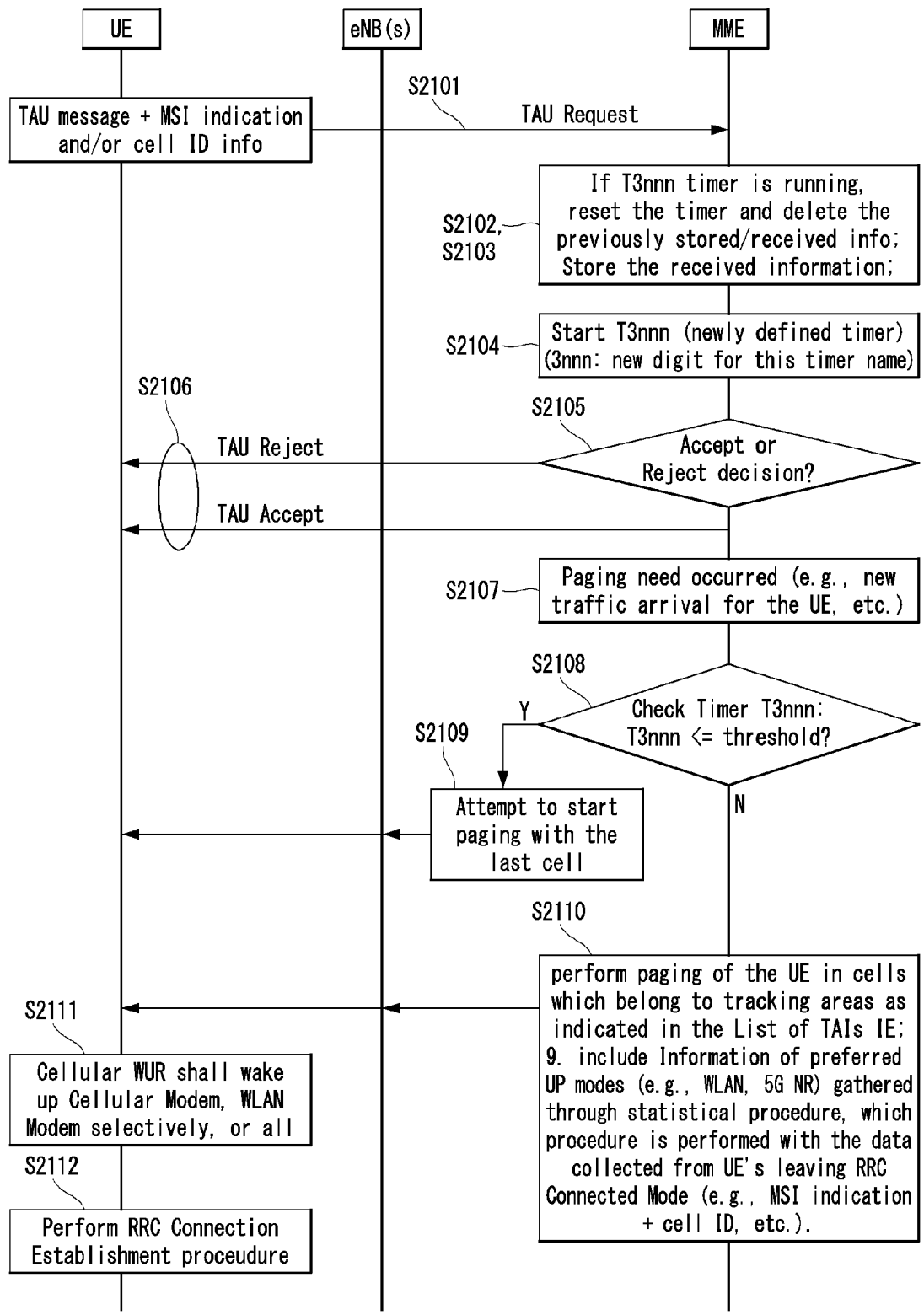

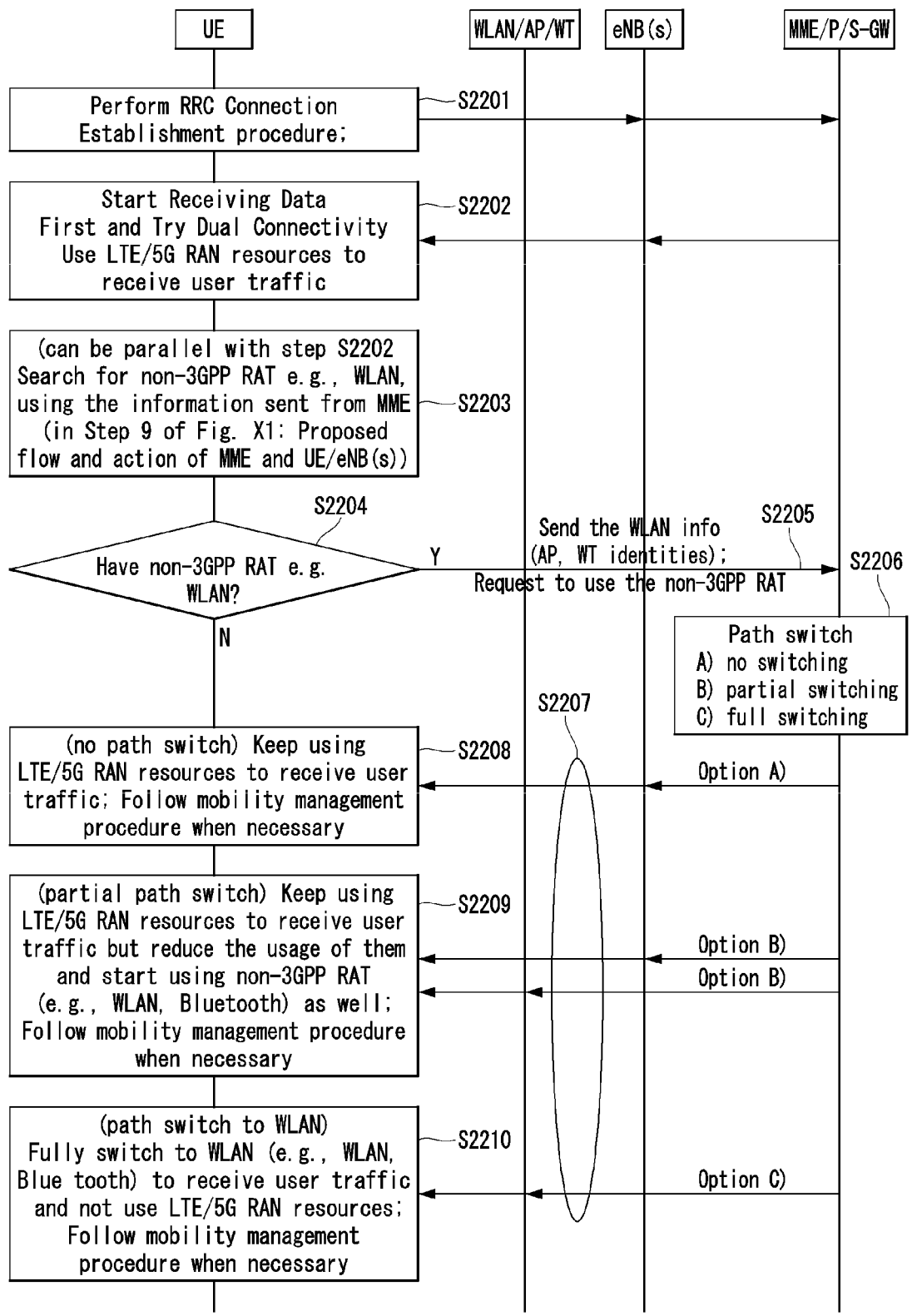
[FIG. 22]

[FIG. 23]
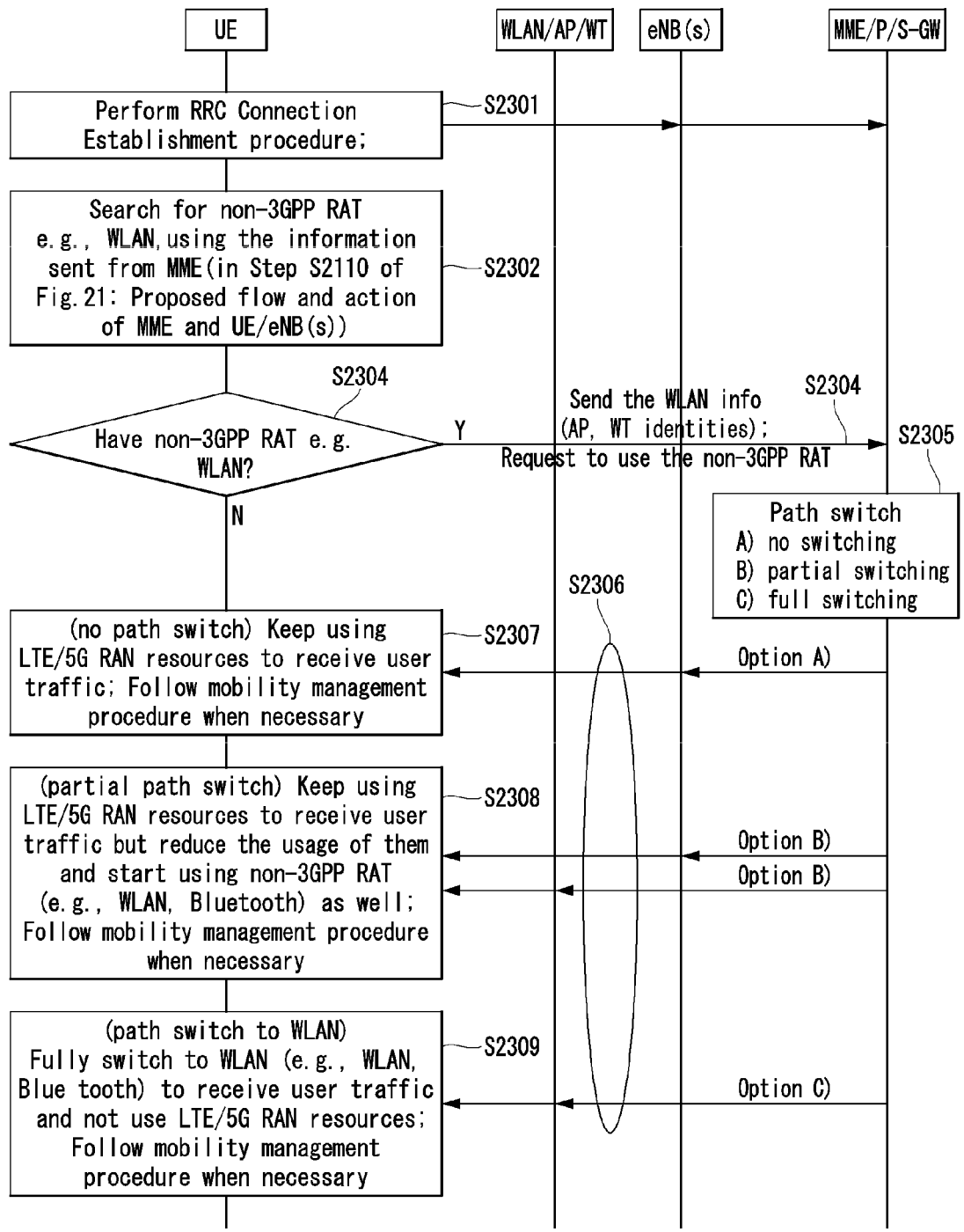

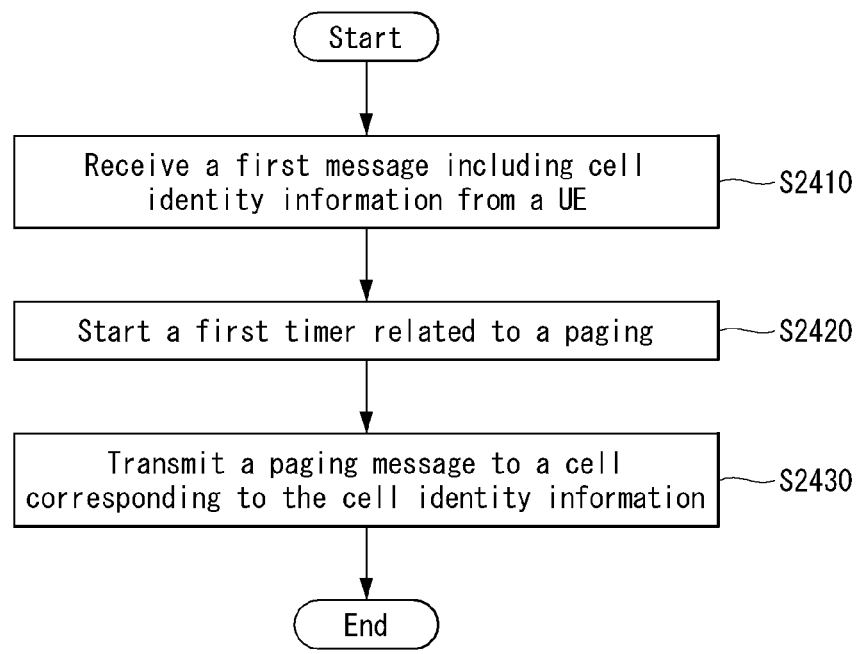
[FIG. 24]

[FIG. 25]
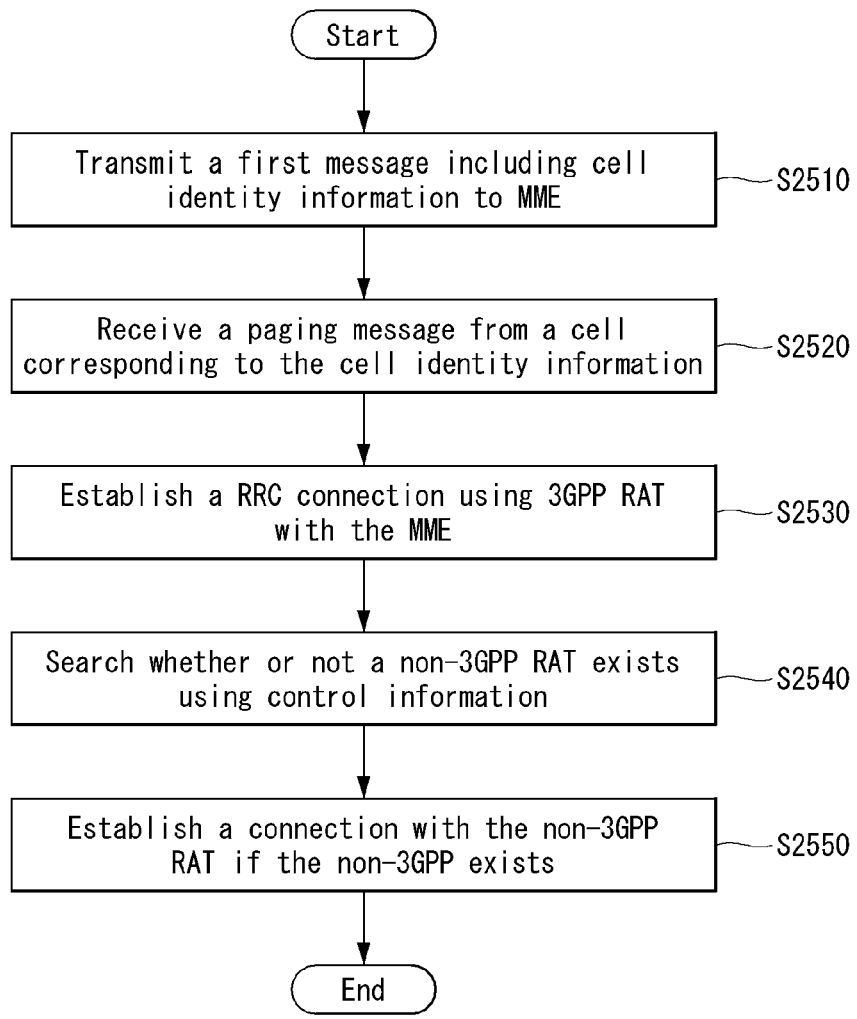
[FIG. 26]
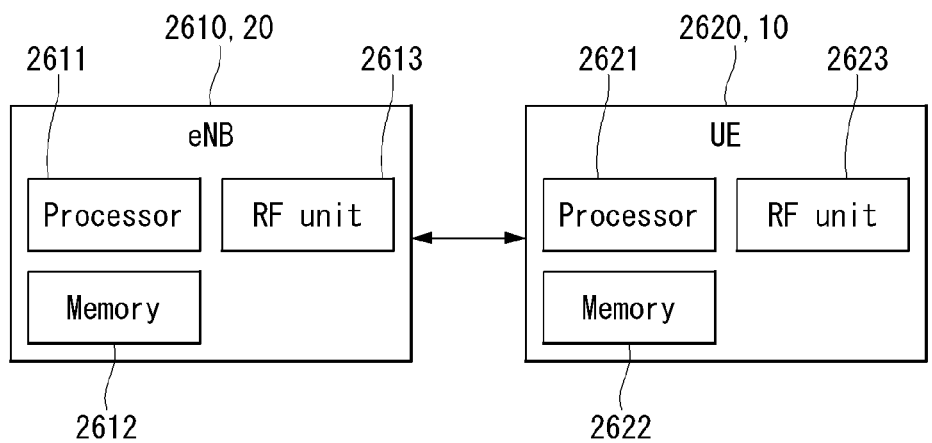

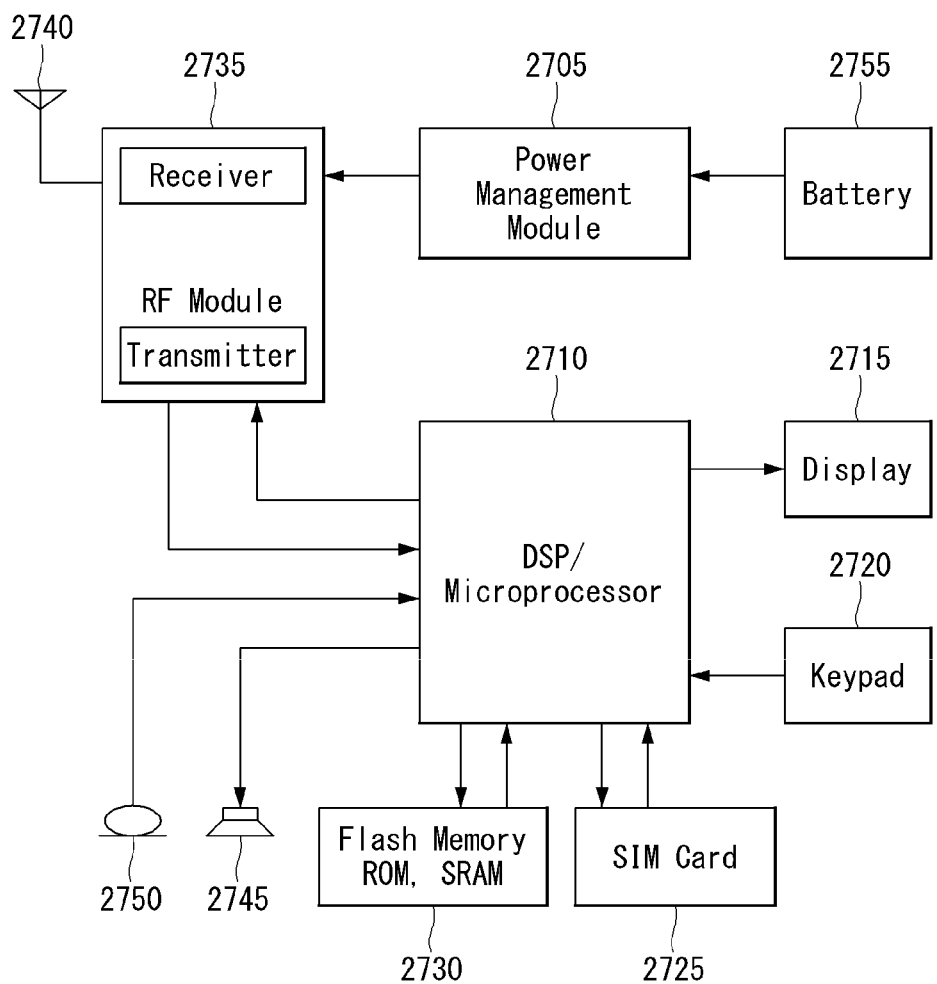
[FIG. 27]

METHOD AND APPARATUS FOR ESTABLISHING A CONNECTION IN A WIRELESS COMMUNICATION SYSTEM

CROSS-REFERENCE TO RELATED APPLICATION

Pursuant to 35 U.S.C. § 119(e), this application claims the benefit of U.S. Provisional Patent Application Nos. 62/530,817, filed on Jul. 10, 2017 and 62/534,635, filed on Jul. 19, 2017, the contents of which are all hereby incorporated by reference herein in their entirety.

BACKGROUND OF THE INVENTION

Field of the Invention

The present invention relates to a method for establishing a connection in a wireless communication system and, more particularly, to a method and apparatus for performing a fast connection establishment and a bearer setup in a wireless communication.

Related Art

Mobile communication systems have been developed to provide voice services while assuring users' activities and mobility. However, the mobile communication systems have been expanding their areas up to data services as well as voice services, and a current explosive growth of traffic caused a lack of resources, so that users require further advanced mobile communication systems offering quicker services.

As requirements for next-generation mobile communication systems, covering drastically increasing data traffic, a significant increase in transmission rate per user, much more linked devices, very low end-to-end latency, and high energy efficiency should be supported. To this end, various techniques are under research, such as small cell enhancement, dual connectivity, massive MIMO (Multiple Input Multiple Output), in-band full duplex, NOMA (non-orthogonal multiple access), super wideband support including unlicensed bands, or device networking.

SUMMARY OF THE INVENTION

An object of this specification is to provide a minimum set indication (MSI) information and identification information of the last cell accessed by a terminal in a heterogeneous network environment which supports dual connectivity and wake-up radio, thereby providing a method for performing a fast connection between the terminal and the network and a bearer setup.

Another object of this specification is to provide a method for searching for a Non-3GPP RAT after establishment of connection between a terminal and a network and transceiving data through a 3GPP RAT and/or a Non-3GPP RAT.

Objects to be achieved in this specification are not limited to the aforementioned advantages, and those skilled in the art to which the present invention pertains may evidently understand other objects from the following description.

This specification provides a method for establishing a connection between a terminal and a network entity in a wireless communication system including a Non-3GPP Radio Access Technology (RAT) or Non-3GPP Radio Interface Technology (RIT).

At first, the method performed by a network entity comprises receiving, from the terminal, a first message including cell identification information indicating a last cell accessed by the terminal; running a first timer related to a paging when the network entity receives the first message; and transmitting a paging message to a cell corresponding to the cell identification information when the paging to the terminal is required before the running first timer expires.

Furthermore, in this specification, the first message further includes a minimum set indication (MSI) information indicating a user plane (UP) mode that the terminal last used.

Furthermore, in this specification, the paging message further comprises control information indicating a UP mode preferred to use in a particular cell.

Furthermore, in this specification, the control information is determined by comparing the received MSI information with a UP mode of a terminal for each cell stored in the network entity.

Furthermore, in this specification, if the control information includes at least two UP modes, each of the at least two UP modes wakes up at least one of a 3GPP communication module or a non-3GPP communication module.

Furthermore, in this specification, the first message is received from the terminal when the terminal receives an RRC connection release message.

Furthermore, in this specification, the first message is included in a tracking area update (TAU) request message.

Furthermore, in this specification, the method further comprises transmitting the paging message to at least one cell included in a tracking area (TA) if the paging is required after the first timer expires.

Furthermore, in this specification, the method further comprises establishing an RRC connection to a 3GPP RAT; and establishing a connection to the Non-3GPP RAT if the Non-3GPP RAT exists, and the Non-3GPP RAT is searched based on the received control information.

Furthermore, in this specification, the establishing the connection to the Non-3GPP RAT further comprises receiving information related to the Non-3GPP RAT from the terminal.

Furthermore, in this specification, the method further comprises transmitting data through the 3GPP RAT before the Non-3GPP RAT is searched.

Furthermore, in this specification, the method further comprises transmitting data through at least one of the 3GPP RAT or the Non-3GPP RAT after establishing the connection with the Non-3GPP RAT.

Next, the method performed by the terminal comprises transmitting, to the network entity, a first message including cell identification information indicating a last accessed cell; and receiving a paging message from a cell corresponding to the cell identification information, wherein the paging message is received when a paging to the terminal is required before a first timer of the network entity expires.

Furthermore, in this specification, a paging message further comprises control information indicating a UP mode preferred to use in a particular cell, and control information is determined by comparing the MSI information with a UP mode of a UE for each cell stored in the network entity.

Furthermore, in this specification, the method further comprises waking up at least one of a 3GPP communication module or a Non-3GPP communication module based on each of the at least two UP modes when the control information includes the at least two UP modes.

Furthermore, in this specification, the method further comprises establishing an RRC connection to a 3GPP RAT; searching for whether a non-3GPP RAT exists using the received control information; and establishing a connection to a Non-3GPP RAT if the Non-3GPP RAT exists.

Furthermore, in this specification, the establishing the connection to the Non-3GPP RAT comprises transmitting information related to the Non-3GPP RAT.

This specification has an advantage in reducing time required for a terminal to search for a Non-3GPP RAT by transmitting MSI information and/or identification information of the last cell accessed by the terminal to a network.

Advantages to be obtained in this specification are not limited to the aforementioned advantages, and those skilled in the art to which the present invention pertains may evidently understand other advantages from the following description.

BRIEF DESCRIPTION OF THE DRAWINGS

FIG. 1 illustrates a block diagram illustrating network structure of an evolved universal mobile telecommunication system (E-UMTS).

FIG. 2 illustrates a block diagram depicting architecture of a typical E-UTRAN and a typical EPC.

In FIG. 3, (a) illustrates the user-plane protocol for the E-UMTS and (b) illustrates the control-plane protocol stack for the E-UMTS.

FIG. 4 illustrates a Structure of the physical channel.

FIG. 5 illustrates a Random Access procedure for E-UTRAN initial access.

FIG. 6 shows an example of an NR structure to which the method proposed in the present specification can be applied.

FIG. 7 shows another example of an NR structure to which the method proposed in the present specification can be applied.

FIG. 8 shows another example of an NR structure to which the method proposed in the present specification can be applied.

FIG. 9 shows another example of an NR structure to which the method proposed in the present specification can be applied.

FIG. 10 shows another example of an NR structure to which the method proposed in the present specification can be applied.

FIG. 11 is a diagram showing an example of the network configuration of an LTE WLAN aggregation (LWA) to which an embodiment of the present invention may be applied.

In FIG. 12, (a) shows an example of LWA wireless protocol architecture for a collocated scenario and (b) shows an example of LWA wireless protocol architecture for a non-collocated scenario.

In FIG. 13, (a) shows U-plane connectivity of eNB and WT involved in LWA for a certain UE and (b) shows C-plane connectivity of eNB and WT involved in LWA for a certain UE.

FIG. 14 shows an example of WT Addition procedure.

FIG. 15 shows an example of WT Modification procedure.

FIG. 16 shows another example of WT Modification procedure.

FIG. 17 shows an example of WT Release procedure.

FIG. 18 shows another example of WT Release procedure.

FIG. 19 shows an example of tracking area updating procedure.

FIG. 20 shows an example of tracking area updating procedure to which the method suggested in the present specification can be applied.

FIG. 21 is a flowchart illustrating an example of a method for transmitting and receiving minimum set indication (MSI) information and cell identification information, the method which is proposed by the present disclosure.

FIG. 22 shows a procedure following an RRC connection establishment procedure shown in FIG. 21.

FIG. 23 shows an example of a method for establishing dual connectivity before receiving user traffic, as proposed by the present disclosure.

FIG. 24 is a flowchart illustrating an example of an operation by a network to perform a method proposed by the present disclosure.

FIG. 25 is a flowchart illustrating an example of an operation by a terminal to perform a method proposed by the present disclosure.

FIG. 26 is a block diagram illustrating a wireless device in which methods as proposed herein may be implemented.

FIG. 27 illustrates a block diagram of a wireless device according to an example of the present specification.

DESCRIPTION OF EXEMPLARY EMBODIMENTS

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments may be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term "eNB" may be replaced with a term, such as a "fixed station", a "base station (BS)", a "Node B", a "base transceiver system (BTS)", an "access point (AP)", a "macro eNB or master eNB (MeNB)" or a "secondary eNB (SeNB)." The term "UE" may be replaced with a term, such as a "terminal", a "mobile station (MS)", a "user terminal (UT)", a "mobile subscriber station (MSS)", a "subscriber station (SS)", a "station (STA)", an "advanced mobile station (AMS)", a "wireless terminal (WT)", a machine-type communication (MTC) device", a "machine-to-machine (M2M) device", a "device-to-device (D2D) device" or a wireless device.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention may be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), LTE-Advanced Pro (LTE-A Pro), 5G New Radio (NR), and 3GPP2. Steps or parts that are not described to clarify the technical features of the present invention may be supported by those documents. Furthermore, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. LTE-A Pro is an evolution of 3GPP LTE-A. 5G NR is a revolution of 3GPP LTE-A that will be implemented by OFDMA or its variants.

For the purposes of the present invention, the following terms and definitions apply.

Access Control: the process that checks whether a UE is allowed to access and to be granted services in a closed cell.

Carrier frequency: center frequency of the cell.

Cell: combination of downlink and optionally uplink resources. The linking between the carrier frequency of the downlink resources and the carrier frequency of the uplink resources is indicated in the system information transmitted on the downlink resources.

Cell Group: in dual connectivity, a group of serving cells associated with either the MeNB or the SeNB.

DCN-ID: DCN identity identifies a specific dedicated core network (DCN).

Dual Connectivity: mode of operation of a UE in RRC_CONNECTED, configured with a Master Cell Group and a Secondary Cell Group.

Elementary Procedure: XwAP protocol consists of Elementary Procedures (EPs). An XwAP Elementary Procedure is a unit of interaction between an eNB and WT. An EP consists of an initiating message and possibly a response message. Two kinds of EPs are used:

Class 1: Elementary Procedures with response (success or failure),

Class 2: Elementary Procedures without response.

E-UTRAN Radio Access Bearer (E-RAB): an E-RAB uniquely identifies the concatenation of an S1 Bearer and the corresponding Data Radio Bearer. When an E-RAB exists, there is a one-to-one mapping between this E-RAB and an EPS bearer of the Non Access Stratum.

Frequency layer: set of cells with the same carrier frequency.

FeMBMS: further enhanced multimedia broadcast multicast service.

Handover: procedure that changes the serving cell of a UE in RRC_CONNECTED.

LTE bearer: in LTE-WLAN Aggregation, a bearer whose radio protocols are located in the eNB only to use eNB radio resources only.

LWA bearer: in LTE-WLAN Aggregation, a bearer whose radio protocols are located in both the eNB and the WLAN to use both eNB and WLAN resources.

LWAAP PDU (Protocol Data Unit): in LTE-WLAN Aggregation, a PDU with DRB (Data Radio Bearer) ID (Identification or IDentifier) generated by LWAAP entity for transmission over WLAN.

Master Cell Group: in dual connectivity, a group of serving cells associated with the MeNB, comprising of the PCell and optionally one or more SCells.

Master eNB: in dual connectivity, the eNB which terminates at least S1-MME (mobility management entity).

MBMS-dedicated cell: cell dedicated to MBMS (multimedia broadcast multicast service) transmission. MBMS-dedicated cell is not supported in this release.

MBMS/Unicast-mixed cell: cell supporting both unicast and MBMS transmissions.

FeMBMS/Unicast-mixed cell: cell supporting MBMS transmission and unicast transmission as SCell.

MCG (Master Cell Group) bearer: in dual connectivity, a bearer whose radio protocols are only located in the MeNB (Master eNB) to use MeNB resources only.

Membership Verification: the process that checks whether a UE is a member or non-member of a hybrid cell.

PLMN ID Check: the process that checks whether a PLMN ID is the RPLMN identity or an EPLMN identity of the UE.

Power saving mode: mode configured and controlled by NAS that allows the UE to reduce its power consumption.

Primary PUCCH group: a group of serving cells including PCell (Primary Cell) whose PUCCH signalling is associated with the PUCCH (Physical Uplink Control Channel) on PCell.

Primary Timing Advance Group: Timing Advance Group containing the PCell. In this specification, Primary Timing Advance Group refers also to Timing Advance Group containing the PSCell unless explicitly stated otherwise.

PUCCH group: either primary PUCCH group or a secondary PUCCH group.

PUCCH SCell: a Secondary Cell configured with PUCCH.

RACH-less HO (Handover)/SeNB (Secondary eNB) change: skipping random access procedure during handover or change of SeNB.

Remote UE: a ProSe-enabled Public Safety UE, that communicates with a PDN (Packet Data Network) via a ProSe UE-to-Network Relay.

SCG (Secondary Cell Group) bearer: in dual connectivity, a bearer whose radio protocols are only located in the SeNB to use SeNB resources.

Secondary Cell Group: in dual connectivity, a group of serving cells associated with the SeNB, comprising of PSCell and optionally one or more SCells.

Secondary eNB: in dual connectivity, the eNB that is providing additional radio resources for the UE but is not the Master eNB.

Secondary PUCCH group: a group of SCells whose PUCCH signalling is associated with the PUCCH on the PUCCH SCell.

Secondary Timing Advance Group: Timing Advance Group containing neither the PCell nor PSCell.

Split bearer: in dual connectivity, a bearer whose radio protocols are located in both the MeNB and the SeNB to use both MeNB and SeNB resources.

Split LWA bearer: in LTE-WLAN Aggregation, a bearer whose radio protocols are located in both the eNB and the WLAN to use both eNB and WLAN radio resources.

Switched LWA bearer: in LTE-WLAN Aggregation, a bearer whose radio protocols are located in both the eNB and the WLAN but uses WLAN radio resources only.

Timing Advance Group: a group of serving cells that is configured by RRC and that, for the cells with an UL configured, use the same timing reference cell and the same Timing Advance value.

WLAN Termination: the logical node that terminates the Xw interface on the WLAN side.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signalling to eNodeBs 20, NAS signalling security, AS Security control, Inter CN node signalling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBRFor clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

FIG. 2 is a block diagram depicting architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

FIGS. 3(a) and 3(b) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 3(a) and 3(b) is depicted because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

As illustrated in FIG. 3(a), the RLC and MAC layers (terminated in an eNodeB 20 on the network side) may perform functions such as Scheduling, Automatic Repeat Request (ARQ), and Hybrid Automatic Repeat Request (HARQ). The PDCP layer (terminated in eNodeB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNodeB 20 on the network side) may perform functions such as broadcasting, paging, RRC connection management, Radio Bearer (RB) control, mobility functions, and UE measurement reporting and controlling.

The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area and may perform PLMN selection and cell re-selection. Also, in RRC-IDLE state, no RRC context is stored in the eNodeB.

In RRC_CONNECTED state, the UE 10 has an E-UTRAN RRC connection and a context in the E-UTRAN, such that transmitting and/or receiving data to/from the network (eNodeB) becomes possible. Also, the UE 10 can report channel quality information and feedback information to the eNodeB.

In RRC_CONNECTED state, the E-UTRAN knows the cell to which the UE 10 belongs. Therefore, the network can transmit and/or receive data to/from UE 10, the network can control mobility (handover and inter-RAT cell change order to GERAN with NACC) of the UE, and the network can perform cell measurements for a neighboring cell.

In RRC_IDLE mode, the UE 10 specifies the paging DRX (Discontinuous Reception) cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

A physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1.0 ms. in length, consists of several symbols. The particular symbol(s) of the sub-frame, such as the first symbol of the sub-frame, can be used for downlink control channel (PDCCH). PDCCHs carries dynamic allocated resources, such as PRBs and MCS.

A transport channel transfers signaling and data between the L1 and MAC layers. A physical channel is mapped to a transport channel.

Downlink transport channel types include a Broadcast Channel (BCH), a Downlink Shared Channel (DL-SCH), a Paging Channel (PCH) and a Multicast Channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming.

The PCH is used for paging a UE. The MCH is used for multicast or broadcast service transmission.

Uplink transport channel types include an Uplink Shared Channel (UL-SCH) and Random Access Channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a Broadcast Control Channel (BCCH), a Paging Control Channel (PCCH), a Common Control Channel (CCCH), a Multicast Control Channel (MCCH) and a Dedicated Control Channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a Dedicated Traffic Channel (DTCH) and a Multicast Traffic Channel (MTCH). The DTCH is a point-to-point channel, dedicated to one UE for the transfer of user information and can exist in both uplink and downlink.

The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

It is known that different cause values may be mapped on the signature sequence used to send messages between a UE and eNB and that either Channel Quality Indicator (CQI) or path loss and cause or message size are candidates for inclusion in the initial preamble.

FIG. 5 illustrates different messages exchanged between a UE and eNB during initial access.

When a UE wishes to access the network and determines a message to be transmitted, the message may be linked to a purpose and a cause value may be determined. The size of the ideal message number 3 illustrated in FIG. 5 may also be determined by identifying all optional information and different alternative sizes, such as by removing optional information, or an alternative "scheduling request" message may be used.

The UE acquires necessary information for the transmission of the preamble, UL interference, Pilot Transmit power and required Signal-to-Noise Ratio (SNR) for the preamble detection at the receiver or combinations thereof. This information must allow the calculation of the initial transmit power of the preamble. It is beneficial to transmit the uplink message in the vicinity of the preamble from a frequency point of view in order to ensure that the same channel is used for the transmission of the message.

The UE should take into account the uplink interference and the uplink path loss in order to ensure that the network receives the preamble with a minimum SNR. The uplink interference can be determined only in the ENodeB and, therefore, must be broadcast by the ENodeB and received by the UE prior to the transmission of the preamble.

The uplink path loss can be considered to be similar to the downlink path loss and can be estimated by the UE from the received Rx (receiver) signal strength when the transmit power of some pilot sequence of the cell is known to the UE.

The required uplink SNR for the detection of the preamble would typically depend on the NodeB configuration, such as a number of Rx antennas and receiver performance.

There may be advantages to transmitting the rather static Transmit power of the pilot and the necessary uplink SNR separately form the varying uplink interference and possibly the power offset required between the preamble and the message.

The initial transmission power of the preamble can be roughly calculated according to the following formula:

Transmit power=TransmitPilot−RxPilot+ULInterference+Offset+SNRRequired.

Therefore, any combination of SNRRequired, ULInterference, TransmitPilot and Offset can be broadcast. In principle, only one value must be broadcast. This is essentially the method in current UMTS systems, although the UL interference in LTE will mainly be neighboring cell interference that is probably more constant than in UMTS.

The UE determines the initial uplink transmit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power for the preamble is not adequate. Another preamble will most likely be transmitted if no acknowledgement or a negative acknowledgement is received by the UE before the next random access attempt. The transmit power of the preamble can be increased, and/or the preamble can be transmitted on a different uplink frequency in order to increase the probability of detection.

Therefore, the actual transmit power of the preamble that will be detected does not necessarily correspond to the initial transmit power of the preamble as initially calculated by the UE.

The UE must determine the possible uplink transport format.

The transport format, which may include Modulation and Coding Scheme (MCS) and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the UE since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the UE according to the received preamble because the UE transmit power compared to the maximum allowed or possible UE transmit power is not known to the eNB, given that the UE will most likely consider the measured path loss in the downlink or some equivalent measure for the determination of the initial preamble transmission power.

The eNB could calculate a difference between the path loss estimated in the downlink compared and the path loss of the uplink. However, this calculation is not possible if power ramping is used and the UE transmit power for the preamble does not correspond to the initially calculated UE transmit power.

Furthermore, the precision of the actual UE transmit power and the transmit power at which the UE is intended to transmit is very low. Therefore, it has been proposed to code the path loss or CQI estimation of the downlink and the message size or the cause value in the uplink in the signature.

Hereinafter, structures of 3GPP dual connectivity using a wake-up radio (WUR) will be described with reference to FIG. 6 to FIG. 10.

That is, FIG. 6 to FIG. 10 show examples of Next Generation (5) architecture, and solid line denotes User Plane whereas dotted line denotes Control Plane in the FIG. 6 to FIG. 10.

FIG. 6 shows an example of an NR structure to which the method proposed in the present specification can be applied.

FIG. 6 shows Standalone NR, NGCN connected; between NG Core and NR (5G New Radio or New RAT; Radio Access Technology); solid is N3 (user plane), dotted is N2 (control plane).

FIG. 7 shows another example of an NR structure to which the method proposed in the present specification can be applied.

FIG. 7 shows Non-Standalone/"LTE assisted", EPC connected; between EPC and LTE; solid is S1_U (user plane), dotted is S1_C (control plane); between LTE and NR, solid is S1_U; between NR and UE, solid is N3 (user plane).

FIG. 8 shows another example of an NR structure to which the method proposed in the present specification can be applied.

FIG. 8 shows Non-Standalone/"NR assisted", NGCN connected: b/w NG Core and NR, solid is N3 (user plane), dotted is N2 (control plane); b/w LTE and NR, solid is S1_U; b/w LTE and UE, solid is S1_U; b/w NR and UE, solid is N3 (user plane), dotted is N2 (control plane) as follows:

FIG. 9 shows another example of an NR structure to which the method proposed in the present specification can be applied.

FIG. 9 shows Standalone LTE Rel-15, NGCN connected; b/w NG Core and LTE, solid is N3 (user plane), dotted is N2 (control plane); b/w LTE and UE, solid is N3 (user plane), dotted is N2 (control plane) as follows:

FIG. 10 shows another example of an NR structure to which the method proposed in the present specification can be applied.

FIG. 10 shows Non-Standalone/"LTE assisted", NGCN connected: b/w NG Core and LTE, solid is N3 (user plane), dotted is N2 (control plane); b/w LTE and UE, solid is S1_U whereas dotted is N2 (control plane); b/w LTE and NR, solid is S1_U; b/w NR and UE, solid is N3 (user plane) as follows:

When WUR concept is introduced in 3GPP, the UE mode can be idle (e.g., ECM idle or RRC idle) or can be much deeper degree of "idle" mode. Therefore, if there is an incoming traffic to a certain UE, which is not in active mode (e.g., RRC connected), the UE should be traced and then get connected. As the circuit of the LTE-Advanced Pro (LTE-A Pro) or 5G transceiver is in off mode with WUR operation, it is not as simple as the previous paging operation (as in the cases with no WUR defined) nor as simple as WLAN-based WUR operation currently worked on in IEEE 802.11.

This invention proposes a fast connection establishment and bearer setup method when the network and UE both have dual connectivity capability and WUR operation capability.

LTE-WLAN Aggregation (LWA)

LTE-WLAN aggregation (LWA) is a technology defined by the 3GPP. In LWA, a mobile handset supporting both LTE and Wi-Fi may be configured by the network to utilize both links simultaneously. It provides an alternative method of using LTE in unlicensed spectrum, which unlike LAA/LTE-U can be deployed without hardware changes to the network infrastructure equipment and mobile devices, while providing similar performance to that of LAA. Unlike other methods of using LTE and WLAN simultaneously (e.g. Multipath TCP), LWA allows using both links for a single traffic flow and is generally more efficient, due to coordination at lower protocol stack layers.

For a user, LWA offers seamless usage of both LTE and Wi-Fi networks and substantially increased performance. For a cellular operator, LWA simplifies Wi-Fi deployment, improves system utilization and reduces network operation and management costs. LWA can be deployed in collocated manner, where the eNB and the Wi-Fi AP or AC are integrated into the same physical device or in non-collocated manner, where the eNB and the Wi-Fi AP or AC are connected via a standardized interface referred to as Xw. The latter deployment option is particularly suitable for the case when Wi-Fi needs to cover large areas and/or Wi-Fi services are provided by a 3rd party (e.g. a university campus), rather than a cellular operator.

LWA has been standardized by the 3GPP in Release-13. Release 14 Enhanced LWA (eLWA) adds support for 60 GHz band (802.11ad and 802.11ay aka WiGig) with 2.16 GHz bandwidth, uplink aggregation, mobility improvements and other enhancements.

From the network perspective, there are two options that provide flexibility when looking at deploying LWA—collocated and non-collocated.

LWA design primarily follows LTE Dual Connectivity (DC) architecture as defined in 3GPP Release 12, which allows a UE to connect to multiple base stations simultaneously, with WLAN used instead of LTE Secondary eNB (SeNB).

In the user plane, LTE and WLAN are aggregated at the Packet Data Convergence Protocol (PDCP) level. In the downlink, the eNB may schedule PDCP PDUs of the same bearer to be delivered to the UE either via LTE or WLAN. In order to perform efficient scheduling and to assign packets to LTE and WLAN links in the most efficient manner, the eNB can receive radio information about both links, including flow control indication. In order to avoid changes to the WLAN MAC, LWA uses an EtherType allocated for this purpose, so that LWA traffic is transparent to WLAN AP.

In the control plane, Evolved Node B (eNB) is responsible for LWA activation, de-activation and the decision as to which bearers are offloaded to the WLAN. It does so using WLAN measurement information reported by the UE. Once LWA is activated, the eNB configures the UE with a list of WLAN identifiers (referred to as the WLAN Mobility Set) within which the UE can move without notifying the network. This is a tradeoff between fully network controlled mobility and fully UE controlled mobility.

Even though WLAN usage in LWA is controlled by cellular network, UE has the option to "opt out" in order to use home WLAN (in case UE does not support concurrent WLAN operation).

Wake-Up Radio (WUR)

Tremendous increase of mobile data traffics has been witnessed due to proliferation of advanced wireless networks, e.g., long-term evolution (LTE) and long-term evolution advanced (LTE-Advanced) networks and smart devices, e.g., smart phones, and tablets. New services and applications will be kept being introduced based on those successful technological achievements, thus there is no doubt that the trend in mobile traffic increase will require major breakthroughs in near future. Even though advances in cellular technology, e.g., LTE, LTE-Advanced, etc., have enhanced the performance and capacity of mobile networks, it will not be sufficient to meet the mobile data demand with exponential growth rate. The usage of unlicensed spectrum provides an attractive opportunity for operators to help support their subscribers by increasing network data capacity Recent research and development (R&D) and standardization efforts have been focused to aggregate heterogeneous LTE and LTE-Advanced networks, and wireless local area network (WLAN) so as to provide increased throughput using unlicensed spectrum and relieve congestion by offloading of cellular data through WLAN. Two interworking features are defined in 3GPP: LTE WLAN Aggregation (LWA) and LTE WLAN Radio Level Integration with IPsec Tunnel (LWIP). In LWA, data aggregation is performed at the radio access network where eNB schedules packets to be transmitted on LTE and WLAN radio links. The advantage of data aggregation at the radio access network (RAN) is that no changes in core network are needed. Main difference between LWA and LWIP lies in who has the control of WLAN. In LWA, cellular operators have control on WLAN, while customers other than operators have the control of WLAN in LWIP.

Wake-up radio (WUR) is being considered in IEEE 802 community due to its much reduced power consumption when primary connectivity WLAN radio is expected inactive [2]. In WUR, the main WLAN module is turned "OFF" and WUR receiver with much lower power consumption characteristics is "ON" and is waiting wake-up packet that indicates for WWUR receiver to wake the main WLAN module up.

To support WLAN devices with WUR capability in the context of LWA and LWIP, new signalling is required to deliver the status of WLAN modules in user equipment (UE) to eNB and wake-up signal to WLAN module before the data transmission from eNB.

Furthermore, it is highly probable that the UE with WLAN module and WUR capability is not in stationary. This implies that the locations of the UE during the "OFF" period of the main WLAN module can be handled by the different access points (APs). The AP into which UE is moved cannot know the presence of a new UE with WLAN and WUR capability, and thus there is no way to associate with the UE.

The following conditions are considered in this invention.

In the UE side, the WUR component shall have capability to wake up the LTE component, 5G component and/or WLAN component.

In the Network side, the WUR component should have capability to wake up the LTE component, and/or 5G component.

FIG. 11 is a diagram showing an example of the network configuration of an LTE WLAN aggregation (LWA) to which an embodiment of the present invention may be applied.

A tremendous increase of mobile data traffics has been witnessed due to proliferation of advanced wireless networks, e.g., long-term evolution (LTE) and long-term evolution advanced (LTE-Advanced) networks and smart devices, e.g., smart phones, and tablets.

New services and applications will be kept being introduced based on those successful technological achievements, thus there is no doubt that the trend in mobile traffic increase will require major breakthroughs in near future. Even though advances in cellular technology, e.g., LTE, LTE-Advanced, etc., have enhanced the performance and capacity of mobile networks, it will not be sufficient to meet the mobile data demand with exponential growth rate.

The usage of unlicensed spectrum provides an attractive opportunity for operators to help support their subscribers by increasing network data capacity.

Recent research and development (R&D) and standardization efforts have been focused to aggregate heterogeneous LTE and LTE-Advanced networks, and wireless local area network (WLAN) so as to provide increased throughput using unlicensed spectrum and relieve congestion by offloading of cellular data through WLAN.

Two interworking features are defined in 3GPP: LTE WLAN Aggregation (LWA) and LTE WLAN Radio Level Integration with IPsec Tunnel (LWIP).

In LWA, data aggregation is performed at the radio access network where eNB schedules packets to be transmitted on LTE and WLAN radio links. The advantage of data aggregation at the radio access network (RAN) is that no changes in core network are needed. Main difference between LWA and LWIP lies in who has the control of WLAN.

In LWA, cellular operators have control on WLAN, while customers other than operators have the control of WLAN in LWIP.

E-UTRAN supports LTE-WLAN aggregation (LWA) operation whereby a UE in RRC_CONNECTED is configured by the eNB to utilize radio resources of LTE and WLAN. Two scenarios are supported depending on the backhaul connection between LTE and WLAN:

non-collocated LWA scenario for a non-ideal backhaul; collocated 6WA scenario for an ideal/internal backhaul;

As shown in FIG. 11, the LWA network includes a WLAN termination (WT) unlike LTE or LTE-A. An eNB and a WT are connected through an Xw interface, that is, a new interface, for control information and data transmission/reception. A WLAN Termination (WT) terminates the Xw interface for a WLAN.

In this case, the WT may be defined as follows.

WT: handles multiple APs, forward data to which AP; WT also notifies eNB that a served terminal has WUR (Wake-Up Receiver). eNB asks WT to wake up the terminal through a related AP.

In an embodiment of the present invention, a WT may be included in an eNB or an AP. That is, the function of the WT may be performed by the eNB or the AP.

FIG. 12 is a diagram showing an example of the wireless protocol architecture of an LTE WLAN aggregation (LWA) to which an embodiment of the present invention may be applied.

In LWA, the radio protocol architecture that a particular bearer uses depends on the LWA backhaul scenario and how the bearer is set up. Two bearer types exist for LWA: split LWA bearer and switched LWA bearer.

The split LWA bearer may transfer LTE data and Wi-Fi data to an RLC layer or an LWAAP layer. That is, the split LWA bearer transfers received LTE data to the RLC layer when the LTE data is received from a higher layer and transfers received Wi-Fi data to the LWAAP layer when the Wi-Fi data is received from a higher layer.

FIG. 12(a) shows an example of LWA wireless protocol architecture for a collocated scenario, and FIG. 12(b) shows an example of LWA wireless protocol architecture for a non-collocated scenario.

For PDUs sent over WLAN in LWA operation, the LTE-WLAN Aggregation Adaptation Protocol (LWAAP) entity generates LWAAP PDU containing a dedicated radio bearer (DRB) identity and the WT uses the LWA EtherType 0x9E65 for forwarding the data to the UE over WLAN. The UE uses the LWA EtherType to determine that the received PDU belongs to an LWA bearer and uses the DRB identity to determine to which LWA bearer the PDU belongs to.

In the downlink, the PDCP sublayer of the UE supports in-sequence delivery of upper layer PDUs based on the reordering procedure introduced for DC. In the uplink, PDCP PDUs can only be sent via the LTE.

The UE supporting LWA may be configured by the eNB to send PDCP status report or LWA status report, in cases where feedback from WT is not available.

Only RLC AM can be configured for an LWA bearer.

E-UTRAN does not configure LWA with DC, LWIP or RAN Controlled LTE-WLAN Interworking (RCLWI) simultaneously for the same UE.

If LWA- and RAN-assisted WLAN interworkings are simultaneously configured for the same UE, in RRC Connected, the UE only applies LWA.

For LWA bearer UL configuration, if the data available for transmission is equal to or exceeds the threshold indicated by E-UTRAN the UE decides which PDCP PDUs are sent over WLAN or LTE. If the data available is below the threshold, the UE transmits PDCP PDUs on LTE or WLAN as configured by E-UTRAN.

For each LWA DRB, E-UTRAN may configure the IEEE 802.11 AC value to be used for the PDCP PDUs that are sent over WLAN in the uplink.

For LWA bearer, for routing of UL data over WLAN the WT MAC address may be provided to the UE by the E-UTRAN or using other WLAN procedure.

FIG. 13 is a diagram showing an example of the connectivity of an eNB and a WT for an LTE WLAN aggregation (LWA) to which an embodiment of the present invention may be applied.

FIG. 13(a) shows an example of a network interface in a user plane, and FIG. 13(b) shows an example of a network interface in a control plane.

In the non-collocated LWA scenario, the eNB is connected to one or more WTs via an Xw interface. In the collocated LWA scenario the interface between LTE and WLAN is up to implementation. For LWA, the only required interfaces to the Core Network are S1-U and S1-MME which are terminated at the eNB. No Core Network interface is required for the WLAN.

User Plane

In the non-collocated LWA scenario, the Xw user plane interface (Xw-U) is defined between eNB and WT. The Xw-U interface supports flow control based on feedback from WT.

The Flow Control function is applied in the downlink when an E-RAB is mapped onto an LWA bearer, i.e. the flow control information is provided by the WT to the eNB for the eNB to control the downlink user data flow to the WT for the LWA bearer. The OAM configures the eNB with the information of whether the Xw DL delivery status provided from a connected WT concerns LWAAP PDUs successfully delivered to the UE or successfully transferred toward the UE.

The Xw-U interface is used to deliver LWAAP PDUs between eNB and WT.

For LWA, the S1-U terminates in the eNB and, if Xw-U user data bearers are associated with E-RABs for which the LWA bearer option is configured, the user plane data is transferred from eNB to WT using the Xw-U interface.

FIG. 13(a) shows U-plane connectivity of eNB and WT involved in LWA for a certain UE: the S1-U is terminated at the eNB; the eNB and the WT are interconnected via Xw-U.

Control Plane

In the non-collocated LWA scenario, the Xw control plane interface (Xw-C) is defined between eNB and WT. The application layer signaling protocol is referred to as Xw-AP (Xw Application Protocol).

The Xw-AP protocol supports the following functions:
Transfer of WLAN metrics (e.g., BSS load) from WT to eNB;
Support of LWA for UE in ECM-CONNECTED:
Establishment, Modification and Release of a UE context at the WT;
Control of user plane tunnels between eNB and WT for a specific UE for LWA bearers.
General Xw management and error handling functions:
Error indication;
Setting up the Xw;
Resetting the Xw;
Updating the WT configuration data.

eNB-WT control plane signaling for LWA is performed by means of Xw-C interface signaling.

There is only one S1-MME connection per LWA UE between the eNB and the MME. Respective coordination between eNB and WT is performed by means of Xw interface signaling.

FIG. 13(b) shows C-plane connectivity of eNB and WT involved in LWA for a certain UE: the S1-MME is terminated in eNB; the eNB and the WT are interconnected via Xw-C.

Mobility

A WLAN mobility set is a set of one or more WLAN Access Points (APs) identified by one or more BSSID/HESSID/SSIDs, within which WLAN mobility mechanisms apply while the UE is configured with LWA bearer(s), i.e., the UE may perform mobility between WLAN APs belonging to the mobility set without informing the eNB.

The eNB provides the UE with a WLAN mobility set. When the UE is configured with a WLAN mobility set, it will attempt to connect to a WLAN whose identifiers match the ones of the configured mobility set. UE mobility to WLAN APs not belonging to the UE mobility set is controlled by the eNB e.g. updating the WLAN mobility set based on measurement reports provided by the UE. A UE is connected to at most one mobility set at a time.

All APs belonging to a mobility set share a common WT which terminates Xw-C and Xw-U. The termination endpoints for Xw-C and Xw-U may differ. The WLAN identifiers belonging to a mobility set may be a subset of all WLAN identifiers associated to the WT.

WLAN Measurements

The UE supporting LWA may be configured by the E-UTRAN to perform WLAN measurements. WLAN measurement object can be configured using WLAN identifiers (BSSID, HESSID and SSID), WLAN carrier information and WLAN band. WLAN measurement reporting is triggered using RSSI. WLAN measurement report contains, for each included WLAN, RSSI and WLAN identifier, and may contain WLAN carrier information, WLAN band, channel utilization, station count, admission capacity, backhaul rate and an indication whether the UE is connected to the WLAN.

WLAN measurements may be configured to support the following:
1. LWA activation;
2. Inter WLAN mobility set mobility;
3. LWA deactivation.

UE is configured with measurements for WLAN using IEEE terminology (e.g. 'Country', 'Operating Class', and/or 'Channel Number').

Procedure for WLAN Connection Status Reporting

The purpose of the WLAN Connection Status Reporting procedure is to provide feedback to the eNB related to the WLAN status and operation. The WLAN Connection Status Reporting procedure supports the following indications:
1. WLAN connection failure;
2. WLAN connection success.

When a UE configured with at least one LWA bearer becomes unable to establish or continue LWA operation, the UE sends the WLANConnectionStatusReport message to indicate "WLAN connection failure" to the eNB.

The criteria to determine WLAN connection failure is left for UE implementation. Upon WLAN connection failure, the UE RRC connection re-establishment is not triggered, data reception on WLAN is suspended, and there is no impact to LTE part of the LWA split bearer.

When a UE configured with at least one LWA bearer successfully connects to an AP, the UE sends the WLAN-ConnectionStatusReport message to indicate "WLAN connection success", if configured by the eNB.

LTE-WLAN Aggregation Operation

WT Addition

The WT Addition procedure is initiated by the eNB and is used to establish a UE context at the WT in order to provide WLAN resources to the UE.

FIG. 14 shows an example of WT Addition procedure.

1. The eNB sends the WT Addition Request message to request the WT to allocate WLAN resources for specific E-RABs, indicating E-RAB characteristics. The WT may reject the request.

The eNB may either decide to request resources from the WT of such an amount, that the QoS for the respective E-RAB is guaranteed by the exact sum of resources provided by the eNB and the WT together, or even more. The eNB's decision may be reflected in step 1 by the E-RAB parameters signalled to the WT, which may differ from E-RAB parameters received over S1.

2. If the WT is able to admit the full or partial WLAN resource request, it responds with the WT Addition Request Acknowledge message.

3. The eNB sends the RRCConnectionReconfiguration message to the UE including the new radio resource configuration.

4. The UE applies the new configuration and replies with the RRCConnectionReconfigurationComplete message.

5. The UE performs WLAN Association.

6. The WT, if supported, sends the WT Association Confirmation message.

7. If configured by the eNB, the UE may send the WLANConnectionStatusReport message.

WT Modification

The WT Modification procedure may be initiated either by the eNB or by the WT and be used to modify, establish or release bearer contexts or to modify other properties of the UE context within the same WT.

The WT Modification procedure does not necessarily need to involve signalling towards the UE.

FIG. 15 shows an example of WT Modification procedure.

Specifically, the WT Modification procedure of FIG. 15 is initiated by the eNB.

1. The eNB sends the WT Modification Request message to request the WT to modify the WLAN resources for specific E-RABs.

The eNB may either decide to request resources from the WT of such an amount, that the QoS for the respective E-RAB is guaranteed by the exact sum of resources provided by the eNB and the WT together, or even more. The eNB's decision may be reflected in step 1 by the E-RAB parameters signalled to the WT, which may differ from E-RAB parameters received over S1.

2. If the WT accepts the request, it applies the modified WLAN resource configuration and responds with the WT Modification Request Acknowledge message.

3. If the modification requires RRC configuration, eNB sends the RRCConnectionReconfiguration message to the UE including the new WLAN radio resource configuration.

4. The UE applies the new RRC configuration and replies with the RRCConnectionReconfigurationComplete message.

5. The UE starts utilizing the new LWA configuration.

FIG. 16 shows another example of WT Modification procedure.

Specifically, the WT Modification procedure of FIG. 16 is initiated by the WT.

1. The WT sends the WT Modification Required message to the eNB to modify the WLAN resources for specific E-RABs.

2. The eNB replies with the WT Modification Confirm message.

3. If the modification requires RRC configuration, eNB sends the RRCConnectionReconfiguration message to the UE including the new WLAN radio resource configuration.

4. The UE applies the new RRC configuration and replies with the RRCConnectionReconfigurationComplete message.

5. The UE starts utilizing the new LWA configuration.

WT Release

The WT Release procedure may be initiated either by the eNB or by the WT and is used to initiate the release of the UE context at the WT. The recipient node of this request cannot reject.

The WT Release procedure does not necessarily need to involve signalling towards the UE.

FIG. 17 shows an example of WT Release procedure.

Specifically, the WT Release procedure of FIG. 17 is initiated by the eNB.

1. The eNB sends the WT Release Request message to request WT to release the allocated WLAN resources.

2. The WT initiates release of all allocated WLAN resources.

3. If required, the eNB sends the RRCConnectionReconfiguration message to the UE indicating the release of WLAN radio resource configuration.

4. The UE releases the LWA configuration.

5. The UE replies with the RRCConnectionReconfigurationComplete message.

It is up to UE implementation what happens with WLAN association after LWA configuration has been released.

FIG. 18 shows another example of WT Release procedure.

Specifically, the WT Release procedure of FIG. 18 is initiated by the WT.

1. The WT sends the WT Release Required message to the eNB to request the release of the allocated WLAN resources.

2. The eNB replies with the WT Release Confirm message.

3. The WT initiates release of all allocated WLAN resources.

4. If required, the eNB sends the RRCConnectionReconfiguration message to the UE indicating the release of WLAN radio resource configuration.

5. The UE releases the LWA configuration.

6. The UE replies with the RRCConnectionReconfigurationComplete message.

It is up to UE implementation what happens with WLAN association after LWA configuration has been released.

Change of WT

The change of WT procedure is initiated by eNB and used to transfer a UE context from a source WT to a target WT. This procedure can be realized using WT Release and WT Addtion procedures.

WLAN Authentication

For a UE supporting LWA, WLAN authentication is performed as follows:

If WT Counter is included in LWA Configuration in the RRC Connection Reconfiguration message, the UE shall start using the S-KWT derived using the WT Counter value and KeNB as PMK or PSK. For a UE already authenticated with WLAN, configuration of a new PMK or PSK triggers refreshing the IEEE 802.11 security using the new PMK or PSK.

If WT Counter is not included in LWA Configuration in the RRC Connection Reconfiguration message:
  if WT Counter has not been previously configured for the UE, the UE which is not already authenticated with a WLAN in the WLAN mobility set shall use authentication methods specified in TS 33.402;
  if WT Counter has been previously configured for the UE, the UE which is not already authenticated with a WLAN in the WLAN mobility set shall keep using the S-KWT previously derived using the WT Counter value and KeNB as PMK or PSK as specified in TS 33.401 and TS 36.331.

the UE which is already authenticated with a WLAN in the WLAN mobility set continues using the previously configured authentication method and is not required to refresh IEEE 802.11 security.

In LWA, the UE may have two bearer types: split LWA bearer and switched LWA bearer. Therefore, in a regular mode of operation to transmit or to receive user data to/from the counterpart (e.g., the Internet cloud or application server), the UE shall use one of LTE bearer, split LWA bearer and switched LWA bearer. These three bearers can be used to deliver user data between a UE and its counterpart (e.g., server, Internet cloud).

However, if wake-up radio (WUR) is introduced, the WLAN component (i.e., transmit/receive portion, or MODEM part) will enter a sleep or idle mode with WUR on.

When a data traffic comes up (for transmission/reception), WUR will notify the WLAN component of such an event so that the WLAN component can wake up.

It is not clearly defined how to reduce the time between the data packet generation and WLAN component's readiness to receive or transmit data. Due to the unique characteristic of WUR, LTE component of UE and E-UTRAN or 3GPP's 5G network node(s) does not know in which cell or in which AP coverage area the UE (destination of the data from somewhere to the UE) is located.

The present invention disclosure is attempting to devise a fast method that can allow 3GPP network to be able to locate the intended UE and get connected to the UE (which will receive the packet) in a timely manner.

More specifically, the method for performing a fast connection establishment and a bearer setup as proposed by the present disclosure will be described with reference to architectures having dual connectivity in FIGS. 7, 8, and 10.

A heterogeneous network used in this specification is a wireless communication system supporting different Radio Access Technologies (RATs) at the same time, and, in this specification, a heterogeneous network is described as an example including an LTE-A Pro system and a 5G cellular system.

First of all, the present disclosure proposes a mechanism in which a UE actively reports information about the last area to a network.

The UE's report information may be last tracking area (TA) or last cell information, etc., and the report information may include a primary cell and/or a secondary cell.

Following is description about a method by which the UE updates the last area upon receiving an RRC connection release message from a network (e.g., a base station.

Specifically, in this specification, when a UE receives an RRC connection release message from a network, the UE transmits a minimum set indication (MSI) of the last active user plane (UP) mode to the network.

That is, when the UE receives the RRC connection release message from the network, the UE transmits an MSI, which indicates the most recently (or last) used UP mode, to the network.

For example, the UP mode may mean a connectivity mode.

For example, the UP mode may mean connection only over Wi-Fi, connection over a combination of Wi-Fi and LTE, connection over LTE and 5G NR, etc.

In the following, Table 1 shows examples of an MSI.

| Value (n bits long); 6 bit example case | Meaning | Note |
| --- | --- | --- |
| 000000 | Reserved | |
| 000010 | LTE only | $2^{nd}$ bit: 0 = no LTE; with LTE |
| 000100 | WiFi only | $3^{rd}$ bit: 0 = no WiFi; with WiFi |
| 001000 | 5G NR only | $4^{th}$ bit: 0 = no 5G NR; with 5G NR |
| 000110 | LTE + WiFi | |
| 001100 | WiFi + 5G NR | |
| 001010 | LTE + 5G NR | |
| 010000 | WUR used | $5^{th}$ bit: 0 = no WUR; 1 = with WUR |
| 010110 | LTE + WiFi with WUR | |
| ... | | |

As shown in Table 1, the MSI may be represented by 6 bits.

In addition, along with the MSI, the UE may transmit, to the network, cell identification information (e.g., an identifier (ID)) of the last cell accessed by the UE.

That is, the UE may transmit the MSI and the cell identification information (or the last cell ID) to an upper layer, and the upper layer may transmit relevant information to an MME.

The upper layer may be, for example, a NAS layer.

In addition, if transmitting of the MSI and the last cell ID is not allowed or failed, the UE may transmit the corresponding information to the network when transmitting a tracking area update request.

In addition, the UE may include this IE (MSI information and cell identification information) to inform the MSI information and cell identification information to MME for MME to use this information when it pages this UE for incoming traffic.

Before looking at FIG. 21, a tracking area updating procedure is briefly described.

Normal and Periodic Tracking Area Updating Procedure

The periodic tracking area updating procedure is controlled in the UE by timer T3412. When timer T3412 expires, the periodic tracking area updating procedure is started. Start and reset of timer T3412.

Normal and Periodic Tracking Area Updating Procedure Initiation

The UE in state EMM-REGISTERED shall initiate the tracking area updating procedure by sending a TRACKING AREA UPDATE REQUEST message to the MME, a) when the UE detects entering a tracking area that is not in the list of tracking areas that the UE previously registered in the MME, unless the UE is configured for "AttachWithIMSI" and is entering a tracking area in a new PLMN that is neither the registered PLMN nor in the list of equivalent PLMNs;

b) when the periodic tracking area updating timer T3412 expires;

c) when the UE enters EMM-REGISTERED.NORMAL-SERVICE and the UE's TIN indicates "P-TMSI";

d) when the UE performs an inter-system change from S101 mode to S1 mode and has no user data pending;

e) when the UE receives an indication from the lower layers that the RRC connection was released with cause "load balancing TAU required";

f) when the UE deactivated EPS bearer context(s) locally while in EMM-REGISTERED, because it could not establish a NAS signalling connection, and then returns to EMM- REGISTERED.NORMAL-SERVICE and no EXTENDED SERVICE REQUEST message, CONTROL PLANE SERVICE REQUEST message or DETACH REQUEST message with detach type is "EPS detach" or "combined EPS/IMSI detach" is pending to be sent by the UE;

g) when the UE changes the UE network capability information or the MS network capability information or both;

h) when the UE changes the UE specific DRX parameter;

i) when the UE receives an indication of "RRC Connection failure" from the lower layers and has no signalling or user uplink data pending (i.e when the lower layer requests NAS signalling connection recovery);

j) when the UE enters S1 mode after 1×CS fallback or 1×SRVCC;

k) when due to manual CSG selection the UE has selected a CSG cell whose CSG identity and associated PLMN identity are not included in the UE's Allowed CSG list or in the UE's Operator CSG list;

l) when the UE reselects an E-UTRAN cell while it was in GPRS READY state or PMM-CONNECTED mode;

m) when the UE supports SRVCC to GERAN or UTRAN or supports vSRVCC to UTRAN and changes the mobile station classmark 2 or the supported codecs, or the UE supports SRVCC to GERAN and changes the mobile station classmark 3;

n) when the UE changes the radio capability for GERAN or cdma2000® or both;

o) when the UE's usage setting or the voice domain preference for E-UTRAN change in the UE;

p) when the UE activates mobility management for IMS voice termination, and the TIN indicates "RAT-related TMSI";

q) when the UE performs an intersystem change from A/Gb mode to S1 mode and the TIN indicates "RAT-related TMSI", but the UE is required to perform tracking area updating for IMS voice termination;

r) upon reception of a paging indication using S-TMSI and the UE is in state EMM-REGISTERED. ATTEMPTING-TO-UPDATE;

s) when the UE needs to update the network with EPS bearer context status due to local de-activation of EPS bearer context(s);

t) when the UE needs to request the use of PSM or needs to stop the use of PSM;

u) when the UE needs to request the use of eDRX or needs to stop the use of eDRX;

v) when a change in the eDRX usage conditions at the UE requires different extended DRX parameters;

w) when a change in the PSM usage conditions at the UE requires a different timer T3412 value or different timer T3324 value;

A change in the PSM or eDRX usage conditions at the UE can include e.g. a change in the UE configuration, a change in requirements from upper layers or the battery running low at the UE.

x) when the CIoT EPS optimizations the UE needs to use, change in the UE; or

For all cases except case b, the UE shall set the EPS update type IE in the TRACKING AREA UPDATE REQUEST message to "TA updating". For case b, the UE shall set the EPS update type IE to "periodic updating".

For case n, the UE shall include a UE radio capability information update needed IE in the TRACKING AREA UPDATE REQUEST message.

For case 1, if the TIN indicates "RAT-related TMSI", the UE shall set the TIN to "P-TMSI" before initiating the tracking area updating procedure.

For case r, the "active" flag in the EPS update type IE shall be set to 1. If a UE is only using EPS services with control plane CIoT EPS optimization, the "signalling active" flag in the Additional update type IE shall be set to 1.

If the UE is using only control plane CIoT EPS optimization, the case i only applies to the case that the UE has indicated to the network that subsequent to the uplink data transmission a downlink data transmission is expected during the transport of uplink user data via the control plane procedure.

If the UE has to request resources for ProSe direct discovery or Prose direct communication, then the UE shall set the "active" flag to 1 in the TRACKING AREA UPDATE REQUEST message.

If the UE does not have any established PDN connection, the "active" flag in the EPS update type IE shall be set to 0.

When the UE has user data pending and performs an inter-system change from S101 mode to S1 mode to a tracking area included in the TAI list stored in the UE, the UE shall perform a service request procedure instead of a tracking area updating procedure.

When initiating a tracking area updating procedure while in S1 mode, the UE shall use the current EPS NAS integrity key to integrity protect the TRACKING AREA UPDATE REQUEST message.

In order to indicate its UE specific DRX parameter while in E-UTRAN coverage, the UE shall send the TRACKING AREA UPDATE REQUEST message containing the UE specific DRX parameter in the DRX parameter IE to the network, with the exception of the case if the UE had indicated its DRX parameter to the network while in GERAN or UTRAN coverage. In this case, when the UE enters E-UTRAN coverage and initiates a tracking area updating procedure, the UE shall not include the UE specific DRX parameter in the DRX parameter IE in the TRACKING AREA UPDATE REQUEST message.

If the UE supports eDRX and requests the use of eDRX, the UE shall include the extended DRX parameters IE in the TRACKING AREA UPDATE REQUEST message.

If the UE supports PSM and requests the use of PSM, the UE shall include the T3324 value IE with a requested timer value in the TRACKING AREA UPDATE REQUEST message. When the UE includes the T3324 value IE and the UE indicates support for extended periodic timer value in the MS network feature support IE, it may also include the T3412 extended value IE to request a particular T3412 value to be allocated.

If a UE supporting CIoT EPS optimizations in NB-S1 mode initiates the tracking area updating procedure for EPS services and "SMS only", the UE shall indicate "SMS only" in the Additional update type IE and shall set the EPS update type IE to "TA updating".

If the UE supports S1-U data transfer and multiple user plane radio bearers in NB-S1 mode, then the UE shall set the Multiple DRB support bit to "Multiple DRB supported" in the UE network capability IE of the TRACKING AREA UPDATE REQUEST message.

If the UE has to request resources for V2X communication over PC5, then the UE shall set the "active" flag to 1 in the TRACKING AREA UPDATE REQUEST message.

After sending the TRACKING AREA UPDATE REQUEST message to the MME, the UE shall start timer T3430 and enter state EMM-TRACKING-AREA-UPDATING-INITIATED. If timer T3402 is currently running, the UE shall stop timer T3402. If timer T3411 is currently running, the UE shall stop timer T3411. If timer T3442 is currently running, the UE shall stop timer T3442.

If the UE supports neither A/Gb mode nor Iu mode, the UE shall include a valid GUTI in the Old GUTI IE in the TRACKING AREA UPDATE REQUEST message. In addition, the UE shall include Old GUTI type IE with GUTI type set to "native GUTI".

If the UE supports A/Gb mode or Iu mode or both, the UE shall handle the Old GUTI IE as follows:

If the TIN indicates "P-TMSI" and the UE holds a valid P-TMSI and RAI, the UE shall map the P-TMSI and RAI into the Old GUTI IE, and include Old GUTI type IE with GUTI type set to "mapped GUTI". If a P-TMSI signature is associated with the P-TMSI, the UE shall include it in the Old P-TMSI signature IE. Additionally, if the UE holds a valid GUTI, the UE shall indicate the GUTI in the Additional GUTI IE.

If the TIN indicates "GUTI" or "RAT-related TMSI" and the UE holds a valid GUTI, the UE shall indicate the GUTI in the Old GUTI IE, and include Old GUTI type IE with GUTI type set to "native GUTI".

If a UE has established PDN connection(s) and uplink user data pending to be sent via user plane when it initiates the tracking area updating procedure, or uplink signalling not related to the tracking area updating procedure when the UE does not support control plane CIoT EPS optimization, it may also set an "active" flag in the TRACKING AREA UPDATE REQUEST message to indicate the request to establish the user plane to the network and to keep the NAS signalling connection after the completion of the tracking area updating procedure.

If a UE is using EPS services with control plane CIoT EPS optimization and has user data pending to be sent via control plane over MME but no user data pending to be sent via user plane, or uplink signalling not related to the tracking area updating procedure, the UE may set a "signalling active" flag in the TRACKING AREA UPDATE REQUEST message to indicate the request to keep the NAS signalling connection after the completion of the tracking area updating procedure.

If the UE has a current EPS security context, the UE shall include the eKSI (either $KSI_{ASME}$ or $KSI_{SGSN}$) in the NAS Key Set Identifier IE in the TRACKING AREA UPDATE REQUEST message. Otherwise, the UE shall set the NAS Key Set Identifier IE to the value "no key is available". If the UE has a current EPS security context, the UE shall integrity protect the TRACKING AREA UPDATE REQUEST message with the current EPS security context. Otherwise the UE shall not integrity protect the TRACKING AREA UPDATE REQUEST message.

When the tracking area updating procedure is initiated in EMM-IDLE mode to perform an inter-system change from A/Gb mode or Iu mode to S1 mode and the TIN is set to "P-TMSI", the UE shall include the GPRS ciphering key sequence number applicable for A/Gb mode or Iu mode and a $nonce_{UE}$ in the TRACKING AREA UPDATE REQUEST message.

When the tracking area updating procedure is initiated in EMM-CONNECTED mode to perform an inter-system change from A/Gb mode or Iu mode to S1 mode, the UE shall derive the EPS NAS keys from the mapped $K'_{ASME}$ using the selected NAS algorithms, $nonce_{MME}$ and $KSI_{SGSN}$ (to be associated with the mapped $K'_{ASME}$) provided by lower layers. The UE shall reset both the uplink and downlink NAS COUNT counters of the mapped EPS security context which shall be taken into use. If the UE has a non-current native EPS security context, the UE shall include the KSIASME in the Non-current native NAS key set identifier IE and its associated GUTI, as specified above, either in the Old GUTI IE or in the Additional GUTI IE of the TRACKING AREA UPDATE REQUEST message. The UE shall set the TSC flag in the Non-current native NAS key set identifier IE to "native security context".

When the tracking area updating procedure is initiated in EMM-IDLE mode, the UE may also include an EPS bearer context status IE in the TRACKING AREA UPDATE REQUEST message, indicating which EPS bearer contexts are active in the UE. The UE shall include the EPS bearer context status IE in TRACKING AREA UPDATE REQUEST message:
for the case f;
for the case s; and
if the UE has established PDN connection(s) of "non IP" PDN type.

If the UE initiates the first tracking area updating procedure following an attach in A/Gb mode or Iu mode, the UE shall include a UE radio capability information update needed IE in the TRACKING AREA UPDATE REQUEST message.

For all cases except case b, if the UE supports SRVCC to GERAN/UTRAN, the UE shall set the SRVCC to GERAN/UTRAN capability bit in the MS network capability IE to "SRVCC from UTRAN HSPA or E-UTRAN to GERAN/UTRAN supported".

For all cases except case b, if the UE supports vSRVCC from S1 mode to Iu mode, then the UE shall set the H.245 after handover capability bit in the UE network capability IE to "H.245 after SRVCC handover capability supported" and additionally set the SRVCC to GERAN/UTRAN capability bit in the MS network capability IE to "SRVCC from UTRAN HSPA or E-UTRAN to GERAN/UTRAN supported" in the TRACKING AREA UPDATE REQUEST message.

For all cases except case b, if the UE supports ProSe direct discovery, then the UE shall set the ProSe bit to "ProSe supported" and set the ProSe direct discovery bit to "ProSe direct discovery supported" in the UE network capability IE of the TRACKING AREA UPDATE REQUEST message.

For all cases except case b, if the UE supports ProSe direct communication, then the UE shall set the ProSe bit to "ProSe supported" and set the ProSe direct communication bit to "ProSe direct communication supported" in the UE network capability IE of the TRACKING AREA UPDATE REQUEST message.

For all cases except case b, if the UE supports acting as a ProSe UE-to-network relay, then the UE shall set the ProSe bit to "ProSe supported" and set the ProSe UE-to-network relay bit to "acting as a ProSe UE-to-network relay supported" in the UE network capability IE of the TRACKING AREA UPDATE REQUEST message.

If the UE supports NB-S1 mode or Non-IP PDN type, then the UE shall support the extended protocol configuration options IE.

For all cases except case b, if the UE supports the extended protocol configuration options IE, then the UE shall set the ePCO bit to "extended protocol configuration options supported" in the UE network capability IE of the TRACKING AREA UPDATE REQUEST message.

For all cases except case b, if the UE supports V2X communication over PC5, then the UE shall set the V2X PC5 bit to "V2X communication over PC5 supported" in the UE network capability IE of the TRACKING AREA UPDATE REQUEST message.

For all cases except case b, if the UE supports the restriction on use of enhanced coverage, then the UE shall set the RestrictEC bit to "Restriction on use of enhanced coverage supported" in the UE network capability IE of the TRACKING AREA UPDATE REQUEST message.

For all cases except case b, if the UE supports the control plane data back-off timer T3448, the UE shall set the CP backoff bit to "backoff timer for transport of user data via the control plane supported" in the UE network capability IE of the TRACKING AREA UPDATE REQUEST message.

FIG. 19 shows an example of tracking area updating procedure.

FIG. 20 shows an example of tracking area updating procedure to which the method suggested in the present specification can be applied.

That is, FIG. 20 shows the proposed method with transmitting additional info "MSI indication and cell ID info" to MME when sending Tracking Area Update (TAU) Request message.

FIG. 21 is a flowchart illustrating an example of a method for transmitting and receiving MSI information and cell identification information as proposed by the present disclosure.

Referring to FIG. 21, along with a TAU message, a UE transmits an MSI indication and/or cell identification information of the last cell accessed by the UE to an MME.

The TAU message may be a TAU request message.

Then, when the first timer (e.g., a T3nnn timer) is being driven, the MME resets the first timer and deletes previously stored or received information in S2120.

The MME stores the information received using the TAU request message in S2103.

Then, the MME drives or starts the first timer (e.g., a T3nnn timer) in S2104.

3nnn is a new digit which indicates the name of the first timer.

Then, the MME determines whether to accept or reject the TAU request message in S2105, and transmits a result of determination to the UE in S2106.

The MME transmits a TAU accept message to the MME upon determining to accept the TAU request message, whereas the MME transmits a TAU reject message to the UE upon determining to reject the TAU request message.

Upon determining necessary to transmit a paging message such as a new traffic arrival for the UE in S2107, the MME compares the first timer and a threshold in S2108.

When a result of the comparison shows that a value of the first timer is smaller than the threshold, the MME transmits the paging message of the last cell accessed by the UE to the UE in S2109.

If the value of the first timer is greater than the threshold in S2108, the MME performs paging of the UE in cells which belong to tracking areas as indicated in the list of TAIs IE in S2110.

In addition, in S2110, the MME may also transmit information indicating preferred UP modes (e.g., WLAN and 5G NR) gathered through statistical procedure.

The statistical procedure may be performed with data collected from the UE's leaving RRC Connected Mode (e.g., MSI indication and cell identification information).

That is, the MME may receive MSI indication and cell identification information from a UE(s), make them as a database, and transmit information indicating a UP mode preferred by a specific UE when performing paging of the specific UE.

The UE or a cellular WUR may wake up a Cellular Modem and/or a WLAN Modem in S2111.

Then, the UE performs an RRC connection establishment procedure with respect to a network in S2112.

In another embodiment, upon receiving a paging message from an MME, a UE may select to establish a connection with an LTE system or a 5G cellular system and look into a possibility of using a Non-3GPP RAT (e.g., WLAN).

FIG. 22 shows a procedure following the RRC connection establishment procedure shown in FIG. 21.

Specifically, FIG. 22 shows a method by which a UE performs an RRC connection establishment with respect to a cellular network, receives first data from the cellular network, and performs dual connectivity with a Non-3GPP RAT.

That is, the UE performs an RRC connection establishment procedure with respect to the cellular network (MME, P-GW/S-GW) in S2201, and receives the first data from the cellular network in S2202.

Then, the UE searches for whether a connectable Non-3GPP RAT (e.g., WLAN) exists using the information received from the network in S2203.

The step S2203 may be identical to the step S2110 of FIG. 21, and may be performed in parallel with the previous step S2202.

Then, the UE confirms whether the UE has a Non-3GPP RAT in S2204.

Upon confirming to have a Non-3GPP RAT (e.g., WLAN), the UE transmits information related to the Non-3GPP RAT (e.g., WLAN information) to the network (MME/P-GW/S-GW) in S2205.

One example of the WLAN may be AP or WT identity. In addition, the WLAN information is a request for use of the Non-3GPP RAT.

Then, the network determines path switching about data in S2206, and transmits relevant information to the UE in S2207.

The path switching may be classified into 1) no switching, 2) partial switching, and 3) full switching.

Following is description about operation of an UE depending on selection of each type of path switching.

When the network selects no switching and transmits relevant information to the UE, the UE uses an LTE/5G RAN in order to keep using user traffic in S2208.

The UE may follow a mobility management procedure, when necessary.

When the network selects partial switching and transmits relevant information to the UE, the UE keep receiving user traffic using LTE/5G RAN resources but reduces the usage of traffic in a cellular network and start using a Non-3GPP RAT (WLAN, Bluetooth) in S2209.

That is, the UE receives the user traffic through a 3GPP RAT and a Non-3GPP RAT.

When the network selects full switching, the network transmits relevant information to the UE, and the UE switches to WLAN to receive user traffic and does not use LTE/5G RAN resources in S2210.

In addition, when it is confirmed in S2204 to not have a Non-3GPP RAT, the UE receives user traffic using LTE/5G RAN in S2208.

Unlike the example of FIG. 22, a method by which a UE establishes dual connectivity and performs offloading with respect to a Non-3GPP RAT before receiving first data will be described with reference to FIG. 23.

That is, when a UE receives a paging message from a network, the UE look into a possibility of using a Non-3GPP RAT without immediately establishing a LTE/5G cellular connection.

FIG. 23 shows an example of a method for establishing dual connectivity before receiving user traffic, as proposed by the present disclosure.

The steps S2303 to S2309 are identical to the steps S2204 to S2210 of FIG. 22, and thus, detailed descriptions thereof will be herein omitted and only the differences therebetween will be described.

In the example of FIG. 23, a UE attempts to establish dual connectivity, without performing the step S2202 of FIG. 22 for receiving first data.

That is, the UE performs the steps S2204 to S2210 of FIG. 22.

Based on the above description, operation by a network and a UE will be described in more detail.

First, operation by a network to perform a fast connection establishment and a bearer setup will be described first.

FIG. 24 is a flowchart illustrating an example of operation by a network to perform a method proposed by the present disclosure.

The network indicates a specific network entity in a cellular network, and may indicate an MME or the like and may be replaced by other terms.

In the following description, a network is indicated by an MME for convenience of explanation.

First, the MME receives, from a UE, a first message including cell identification information indicating the last cell accessed by the UE in S2410.

The first message may be transmitted from the UE when the UE receives an RRC connection release message.

In addition, the first message may be included in a TAU request message or may be transmitted along with the TAU request message.

Then, when receiving the first message, the MME drives a first timer related to paging in S2420.

The first timer may be the aforementioned T3nnn timer.

When it is necessary to perform paging with respect to the UE before the first timer expires, the MME transmit a paging message to a cell corresponding to the cell identification information (that is, the last cell accessed by the UE) in S2430.

In addition, the MME may further receive, from the UE, MSI information indicating the last UP mode used by the UE.

The MSI information may be included in the first message or may be transmitted after transmission of the first message.

In addition, the paging message transmitted in the step S2430 may further include control information indicating a UP mode preferred to use in a particular cell.

The control information may be determined by comparing the received MSI information and a UP mode of the UE in each cell stored in the MME.

When the control information includes at least two UP modes, each of the at least two UP modes may wake up at least one of a 3GPP communication module or a Non-3GPP module.

If the MME determines necessary to transmit the paging message after the first timer expires, the MME may transmit the paging message to cells belonging to a tracking area (TA).

In addition, an RRC connection establishment between the UE and the MME is performed.

In this case, when a Non-3GPP Radio Access Technology (RAT) exists, the UE further establishes a connection with the Non-3GPP RAT.

The Non-3GPP RAT may be searched based on the received control information.

The procedure of establishing connection with the Non-3GPP RAT may be performed based on information related to the Non-3GPP RAT, which is received by the MME from the UE.

In this case, the UE may receive data using the 3GPP RAT before searching for the Non-3GPP RAT, or may receive data using at least one of the 3GPP RAT or the Non-3GPP RAT after establishing connection with the Non-3GPP RAT.

Following is description about an example of operation by a UE to perform a fast connection establishment and a bearer setup.

FIG. 25 is a flowchart illustrating an example in which a UE performs a method proposed by the present disclosure.

First, the UE transmits, to an MME, a first message including cell identification information indicating the last cell accessed by the UE in S2510.

Then, the UE receives a paging message from a cell corresponding to the cell identification information in S2520.

The paging message may be received when it is necessary to perform paging of the UE before a first timer of the MME expires.

As described above, the first message may further include MSI information indicating the most recently used UP mode.

In addition, the paging message further includes control information indicating a UP mode preferred to use in a particular cell.

Then, the UE establishes RRC connection with the MME using a 3GPP RAT.

The UE searches for whether a Non-3GPP RAT exists using the received control information in S2540.

When the Non-3GPP RAT exists, the UE establishes connection with the Non-3GPP RAT in S2550.

The UE may receive data from the 3GPP RAT before searching for the Non-3GPP RAT, or may receive data after establishing connection with the Non-3GPP RAT.

The UE may transmit information related to the Non-3GPP RAT to the MEE through the procedure of establishing connection with the Non-3GPP RAT.

The connection establishment procedure with respect to the Non-3GPP RAT may be performed based on the received information related to the Non-3GPP RAT.

As described above, if a UE transmits MSI information and cell identification information of the last cell accessed by the UE to a network, the network may calculate, in an upper layer, statistics about which UP mode is used in which cell, and, eventually, this enables establishment of connection with a UE which is able to use a UP mode best for the UE.

In addition, the aforementioned MSI information may be used to search for a Non-3GPP RAT when a UE performs dual connectivity, and thus, the MSI information helps to reduce the time for searching for the Non-3GPP.

FIG. 26 is a block diagram illustrating a wireless device in which methods as proposed herein may be implemented.

In this case, the wireless device may be a BS, UE, WT, AP, MME or a network entity.

As shown in FIG. 26, the network entity 2610 and the UE 2620 include communication units (transmitting/receiving units, RF units (or RF module), 2613 and 2623), processors 2611 and 2621, and memories 2612 and 2622.

The network entity and the UE may further input units and output units.

The communication units 2613 and 2623, the processors 2611 and 2621, the input units, the output units, and the memories 2612 and 2622 are operatively connected with each other in order to conduct the methods as proposed herein.

The communication units (transmitting/receiving units or RF units, 2613 and 2623), when receiving information created from a Physical Layer (PHY) protocol, transfer the received information through Radio Frequency (RF) spectrums and conduct filtering and amplification, then transmit the results through antennas.

Furthermore, the communication units transfer Radio Frequency (RF) signals received through the antennas to bands capable of being processed by the PHY protocol, and perform filtering.

However, the communication units may also include the functions of switches to switch transmitting and receiving functions.

The processors 2611 and 2621 implement functions, procedures, and/or methods as proposed herein. The layers of radio interface protocols may be implemented by the processors.

The processors may be represented as control parts, controllers, control units, or computers.

The memories 2612 and 2622 are connected with the processors to store protocols or parameters for tracking a location vehicle UE.

The processor may include an application-specific integrated circuit (ASIC), a separate chipset, a logic circuit, and/or a data processing unit. The memory may include read-only memory (ROM), random access memory (RAM), flash memory, memory cards, storage media and/or other equivalent storage devices. The RF unit may include a base-band circuit for processing a radio signal. When the embodiment of the present invention is implemented in software, the aforementioned methods may be implemented with a module (or a process or a function) for performing the aforementioned functions. The module may be stored in the memory and may be performed by the processor. The memory may be located inside or outside the processor, and may be coupled to the processor by using various well-known means.)

The output unit (display unit) is controlled by the processor and outputs information from the process, together with various information signals from the processor and key input signals generated from the key input unit.

Furthermore, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

Meanwhile, the procedure of transceiving a wake-up signal as described herein may be implemented as processor-readable codes in a recording medium that may be read by a processor provided in a network device.

The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Furthermore, the recording media readable by the processor may be distributed to computer systems connected with each other via a network, and processor readable codes may be stored and executed in a distributing manner.

FIG. 27 illustrates a block diagram of a wireless device according to an example of the present specification.

Specifically, FIG. 27 illustrates the terminal (UE) of FIG. 26 in detail.

Referring to FIG. 27, the UE may include a processor (or a digital signal processor (DSP) 2710, a radio frequency (RF) module (or an RF unit) 2735, a power management module 2705, an antenna 2740, a battery 2755, a display 2715, a keypad 2720, a memory 2730, a subscriber identification module (SIM) card 2725 (this element is optional), a speaker 2745, and a microphone 2750. The UE may also include a single antenna or multiple antennas.

The processor 2710 implements the functions, processes and/or methods proposed in FIGS. 1 to 25 described above. A layer of a radio interface protocol may be implemented by the processor 2710.

The memory may be connected to the processor 2710 and stores information related to an operation of the processor 2710. The memory 2730 may be present within or outside the processor 2710 and may be connected to the processor 2710 by a well known unit.

A user may input command information such as a phone number, or the like, by pressing (or touching) a button of the keypad 2720 or by voice activation using the microphone 2750. The processor 2710 receives the command information and performs an appropriate function such as making a call, or the like. Operational data may be extracted from the SIM card 2725 or the memory 2730. Also, the processor 2710 may display command information or driving information on the display 2715 for user recognition or for user convenience.

The RF module 2735 is connected to the processor 2710 and transmits and/or receives an RF signal. The processor 2710 delivers command information to the RF module 2735 in order to initiate communication, for example, in order to transmit a wireless signal forming voice communication data. The RF module 2735 includes a receiver and a transmitter to receive and transmit a wireless signal. The antenna 2740 serves to transmit and receive a wireless signal. When a wireless signal is received, the RF module 2735 delivers the signal and converts the signal to a baseband signal so as to be processed by the processor 2710. The processed signal may be converted into an audible or readable information output through the speaker 2745.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

Examples in which the method for transmitting and receiving a wake-up signal in a wireless communication system according to an embodiment of the present invention has been applied to 3GPP LTE/LTE-A/LTE-Pro/New Rat systems have been described, but the method may be applied to various wireless communication systems in addition to the 3GPP LTE/LTE-A/LTE-Pro/New Rat systems.

What is claimed is:

1. A method for establishing a connection between a terminal and a network entity in a wireless communication system including a Non-3GPP Radio Access Technology (RAT), the method performed by the network entity comprising:
receiving, from the terminal, a first message including cell identification information for a last cell accessed by the terminal;
running a first timer related to a paging when the network entity receives the first message; and
transmitting a paging message to a cell corresponding to the cell identification information when the paging to the terminal is required before the running first timer expires,
wherein the first message further includes a minimum set indication (MSI) information indicating a user plane (UP) mode that the terminal last used.

2. The method of claim 1, wherein the paging message further comprises control information for a UP mode preferred to use in a particular cell.

3. The method of claim 2, wherein the control information is determined by comparing the received MSI information with a UP mode of a terminal for each cell stored in the network entity.

4. The method of claim 2, wherein if the control information includes at least two UP modes, each of the at least two UP modes wakes up at least one of a 3GPP communication module or a non-3GPP communication module.

5. The method of claim 1, wherein the first message is received from the terminal when the terminal receives an RRC connection release message.

6. The method of claim 1, wherein the first message is included in a tracking area update (TAU) request message.

7. The method of claim 1, further comprising:
transmitting the paging message to at least one cell included in a tracking area (TA) if the paging is required after the first timer expires.

8. The method according to claim 1, further comprising:
establishing an RRC connection to a 3GPP RAT; and
establishing a connection to the Non-3GPP RAT if an available Non-3GPP RAT exists,
wherein the Non-3GPP RAT is searched based on the received control information.

9. The method of claim 8, wherein the establishing the connection to the Non-3GPP RAT comprising:
receiving information related to the Non-3GPP RAT from the terminal.

10. The method of claim 8, further comprising:
transmitting data through the 3GPP RAT before the Non-3GPP RAT is searched.

11. The method of claim 8, further comprising:
transmitting data through at least one of the 3GPP RAT or the Non-3GPP RAT after establishing the connection with the Non-3GPP RAT.

12. A method for establishing a connection between a terminal and a network entity in a wireless communication system including a Non-3GPP RAT, the method performed by the terminal comprising:
transmitting, to the network entity, a first message including cell identification information for a last accessed cell; and
receiving a paging message from a cell corresponding to the cell identification information,
wherein the paging message is received when a paging to the terminal is required before a first timer of the network entity expires, and
wherein the first message further includes a minimum set indication (MSI) information indicating a user plane (UP) mode that the terminal last used.

13. The method of claim 12, wherein the paging message further comprises control information for a UP mode preferred to use in a particular cell.

14. The method of claim 13, wherein the control information is determined by comparing the MSI information with a UP mode of a UE for each cell stored in the network entity.

15. The method of claim 13, further comprising:
waking up at least one of a 3GPP communication module or a Non-3GPP communication module based on each of the at least two UP modes when the control information includes the at least two UP modes.

16. The method of claim 12, further comprising:
establishing an RRC connection to a 3GPP RAT;
searching for whether a non-3GPP RAT exists using the received control information; and
establishing a connection to a Non-3GPP RAT if the Non-3GPP RAT exists.

17. The method of claim 16, wherein the establishing the connection to the Non-3GPP RAT comprising:
transmitting information related to the Non-3GPP RAT.

18. A network entity for establishing a connection between a terminal and the network entity in a wireless communication system including a Non-3GPP Radio Access Technology (RAT), comprising:
a communication module configured to communicate with the outside in a wireless or a wired manner; and
a processor functionally connected to the communication module, wherein the processor is configured:
to receive, from the terminal, a first message including cell identification information indicating a last cell accessed by the terminal;

to run a first timer related to a paging when the network entity receives the first message; and to transmit a paging message to a cell corresponding to the cell identification information when the paging to the terminal is required before the running first timer expires, wherein the first message further includes a minimum set indication (MSI) information indicating a user plane (UP) mode that the terminal last used.

* * * * *